US012291385B1

(12) United States Patent
Dillard

(10) Patent No.: US 12,291,385 B1
(45) Date of Patent: May 6, 2025

(54) FOOD SHAKING SEASONING APPARATUS AND ASSOCIATED NON-FUNGIBLE TOKEN

(71) Applicant: The Easy Shaker Product Company LLC, Sheridan, WY (US)

(72) Inventor: Maurice Dillard, Humble, TX (US)

( * ) Notice: Subject to any disclaimer, the term of this patent is extended or adjusted under 35 U.S.C. 154(b) by 99 days.

(21) Appl. No.: 18/325,498

(22) Filed: May 30, 2023

Related U.S. Application Data

(60) Provisional application No. 63/378,972, filed on Oct. 10, 2022, provisional application No. 63/347,774, filed on Jun. 1, 2022.

(51) Int. Cl.
*B65D 77/04* (2006.01)
*B01F 33/501* (2022.01)
*B01F 35/32* (2022.01)
*B65D 25/30* (2006.01)
*B65D 43/02* (2006.01)
*B01F 101/06* (2022.01)

(52) U.S. Cl.
CPC ...... *B65D 77/0486* (2013.01); *B01F 33/5011* (2022.01); *B01F 35/32021* (2022.01); *B65D 25/30* (2013.01); *B65D 43/0202* (2013.01); *B01F 2101/06* (2022.01); *B65D 2203/06* (2013.01); *B65D 2543/00092* (2013.01); *B65D 2543/00351* (2013.01)

(58) Field of Classification Search
CPC .... B65D 2585/6837; B65D 2590/0083; B65D 77/0486; B65D 25/30; B65D 43/0202; B65D 2203/06; B65D 2543/00092; B65D 2543/00351; B01F 33/5011; B01F 35/32021; B01F 2101/06
See application file for complete search history.

(56) References Cited

U.S. PATENT DOCUMENTS

| | | | | |
|---|---|---|---|---|
| 3,756,451 | A * | 9/1973 | Popeil | B65D 25/32 15/264 |
| 4,360,119 | A | 11/1982 | Olivo | |
| 6,431,415 | B1 | 8/2002 | Schreiber | |
| D626,790 | S | 11/2010 | Gibson | |
| 9,382,047 | B2 | 7/2016 | Schmidtner | |
| 10,220,980 | B2 | 3/2019 | Randazzo | |
| 10,621,605 | B2 | 4/2020 | Heitmueller | |
| 10,968,029 | B1 * | 4/2021 | Rane | B65D 81/383 |

(Continued)

FOREIGN PATENT DOCUMENTS

KR 20110010832 U 11/2011

*Primary Examiner* — Kareen K Thomas

(74) *Attorney, Agent, or Firm* — Matthew Compton; Compton & Associates PLLC

(57) ABSTRACT

One embodiment of an Easy Shaker may comprise a container, a sleeve, and a lid for use in distributing seasonings and flavorings for foodstuffs. One embodiment of an Easy Shaker may comprise a container and a sleeve. Another embodiment of an Easy Shaker may comprise a sleeve with an elastic band. An Easy Shaker may have token linking information associated therewith, in some embodiments, embedded in a two-dimensional data matrix (e.g., a QR code). A user may obtain access to a non-fungible token (NFT) on a blockchain by use of token linking information associated with an object such as a popcorn bucket or an Easy Shaker. The non-fungible token may describe the popcorn bucket, the Easy Shaker, or some other physical or intangible object.

2 Claims, 22 Drawing Sheets

(56) References Cited

U.S. PATENT DOCUMENTS

| | | | | |
|---|---|---|---|---|
| 2014/0217096 | A1 | 8/2014 | Simpson | |
| 2016/0114237 | A1 | 4/2016 | Garcia | |
| 2016/0213180 | A1 * | 7/2016 | Javaruski | B65D 25/24 |
| 2018/0117447 | A1 * | 5/2018 | Tran | G09B 19/0038 |
| 2019/0262230 | A1 * | 8/2019 | Bentkovski | A61J 1/1418 |
| 2021/0130075 | A1 * | 5/2021 | Long | B65D 81/3851 |
| 2021/0174375 | A1 * | 6/2021 | Dolmayan | G06F 21/32 |
| 2022/0067865 | A1 * | 3/2022 | Sohmshetty | H04L 9/0825 |
| 2022/0069996 | A1 | 3/2022 | Xue | |
| 2022/0261882 | A1 | 8/2022 | Youb | |
| 2024/0375841 | A1 * | 11/2024 | Perea-OcHoa | B65D 81/18 |

* cited by examiner

FOOD SHAKING SEASONING APPARATUS AND ASSOCIATED NON-FUNGIBLE TOKEN

CROSS-REFERENCE TO RELATED APPLICATIONS

This patent application claims priority to U.S. Provisional App. No. 63/378,972 filed Oct. 10, 2022 and to U.S. Provisional App. No. 63/347,774 filed Jun. 1, 2022, all of which are hereby incorporated herein by reference.

FIELD OF THE INVENTION

The present invention generally relates to an apparatus for a container, the apparatus for assisting the user to mix and/or season foods, and linking a non-fungible token with a physical product.

BACKGROUND OF THE INVENTION

Modern containers lack the space necessary to shake the container and thereby distribute seasonings or toppings. For example, a container filled to the top with popcorn having butter and salt applied to the top cannot easily be shaken to distribute the butter and salt without spilling popcorn. Likewise for salads, distributing salad toppings within the salad by shaking may be difficult if the salad fills the container to the top. Shaking without spilling is especially difficult when a container is overly full and a lid cannot be placed thereon, placing a lid would create insufficient space for distribution of seasonings/toppings by shaking, and/or placing a lid would undesirably crush the contents of the container. There is also a need to provide proof of ownership with respect to tangible items such as art, toys, and collectibles. Non-fungible tokens recorded in a blockchain provide a way to meet that need.

BRIEF DESCRIPTION

One embodiment of the present invention may be an apparatus having a container that may comprise one or more side walls and a bottom and an upper ridge along a side wall. The upper ridge may protrude at least away from the side wall (or a plane thereof) and may protrude at least away from the interior of the container. The apparatus may have a sleeve for encompassing the container. The sleeve may comprise one or more side walls. The sleeve side walls may define an encompassed space. At least one sleeve side wall may comprise a lower lip which may project at least toward the interior of the sleeve. In a deployed state, the upper ridge of the container may interface with the lower lip of the sleeve so as to stop further movement of the sleeve in the direction of deployment.

In another embodiment, the apparatus may comprise a grate for resting on the bottom of the interior of the container. The grate may comprise legs which rest on the bottom interior the container. The apparatus may have a lid. The sleeves may have one or two or more handle openings on the upper half of the sleeve that is opposite the lower lip.

In another embodiment, an apparatus may comprise a bucket (e.g., a popcorn bucket) with one or more side walls, a bottom, and an area having token linking information encoded therein. The token linking information may be associated with a token present in a blockchain. In one embodiment, the token may be a non-fungible token comprising data descriptive of the bucket. In one embodiment, the token is a non-fungible token. In another embodiment, the token may be a fungible token. In one embodiment, the blockchain is the Ethereum blockchain. In another embodiment, the blockchain is the Bitcoin blockchain. In one embodiment, the token may comprise data descriptive of a multimedia file depicting a scene associated with a movie. In another embodiment, the token may comprise data descriptive of a multimedia file depicting activity at sporting event. In another embodiment, the token may comprise data descriptive of a digital representation of a character in a movie.

The bucket may have an upper ridge along a side wall. The upper ridge may protrude away from the side wall (or a plane thereof) and/or away from the interior of the bucket. In one embodiment, a sleeve may be used with the bucket. The sleeve may encompass the bucket. The sleeve may have one or more side walls. The sleeve side walls may define an encompassed space. At least one sleeve side wall may comprise a lower lip projecting at least toward the interior of the sleeve. In a deployed state, the upper ridge of the bucket may interface with the lower lip of the sleeve so as to stop further movement of the sleeve in the direction of deployment.

In one embodiment, a method for utilizing a blockchain token may include receiving from a user over the internet one or more parameters associated with token linking information. The token linking information may be associated with a bucket including in some embodiments by way of embedding in a two-dimensional data matrix (e.g., a QR code) on the bucket or on a sleeve used with the bucket. A user may be provided access to a token present in a blockchain that is associated with at least one of the one or more parameters received from the user. In one embodiment, the token may be a non-fungible token comprising data descriptive of the bucket. In one embodiment, the token is a non-fungible token. In another embodiment, the token may be a fungible token. In one embodiment, the blockchain is the Ethereum blockchain. In another embodiment, the blockchain is the Bitcoin blockchain. In one embodiment, the token may comprise data descriptive of a multimedia file depicting a scene associated with a movie. In another embodiment, the token may comprise data descriptive of a multimedia file depicting activity at sporting event. In another embodiment, the token may comprise data descriptive of a digital representation of a character in a movie.

In one embodiment, a sleeve may be used that encompasses the bucket. The sleeve may comprise one or more side walls. The sleeve side walls may define an encompassed space. At least one sleeve side wall may comprise a lower lip that may project at least toward the interior of the sleeve.

In one embodiment, a container may comprise one or more side walls and a bottom and an upper ridge along a side wall. The upper ridge may protrude away from the side wall (or a plane thereof) and/or at least away from the interior of the container. A sleeve may encompass the container at or adjacent to the upper ridge. The sleeve may have one or more side walls. The side walls may define an enclosed space. An elastic band may be incorporated into a lower edge of the sleeve for attachment of the sleeve to a container at the upper ridge of the container. The sleeve may have one or two or more handle openings on the upper half of the sleeve that is opposite the lower edge.

The above embodiments are merely examples and not meant to be exhaustive of potential embodiments, nor are they intended to limit the scope of the claims herein.

DETAILED DESCRIPTION

Figure 1:
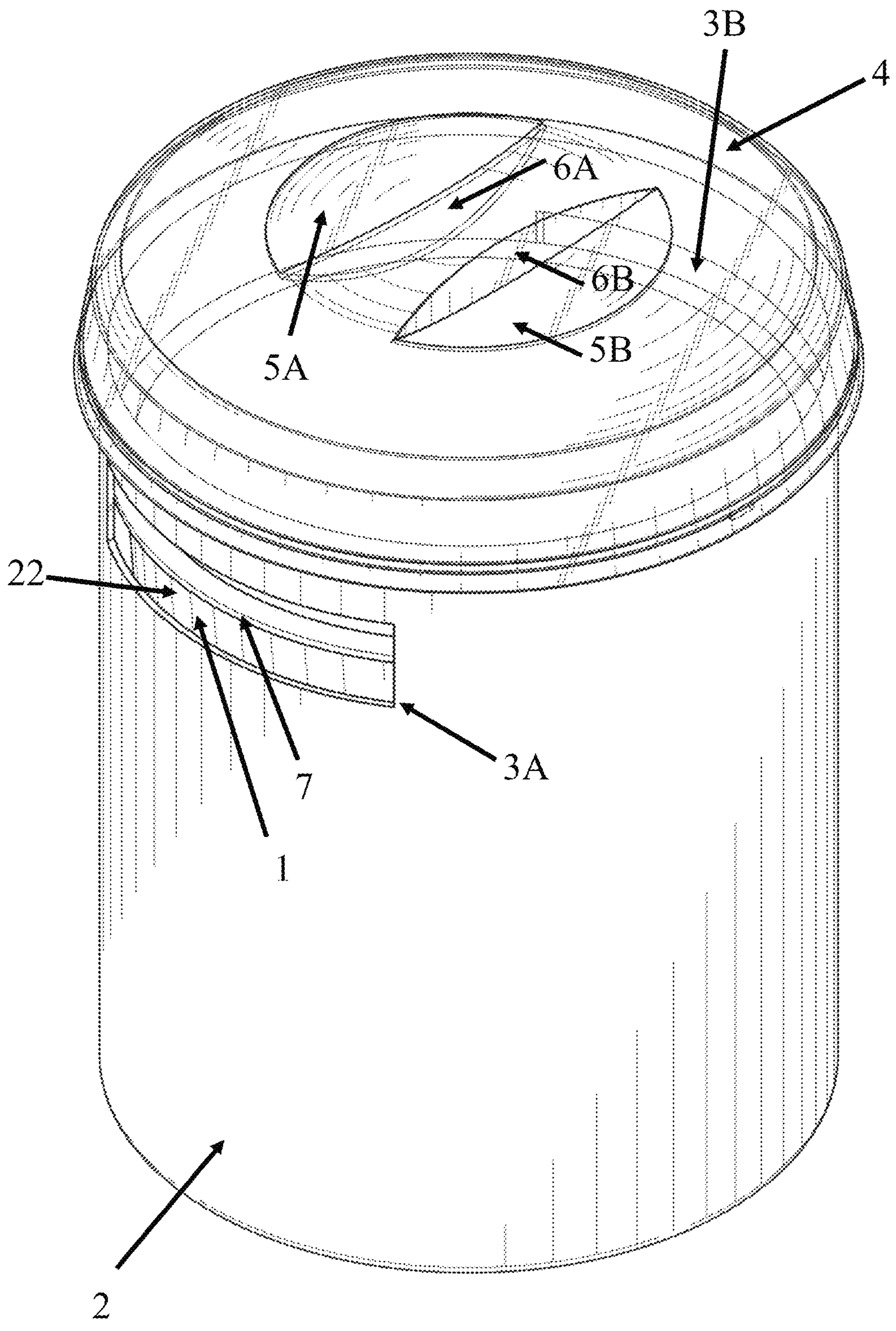
FIG. 1 depicts, from an upper perspective view, an embodiment of an Easy Shaker comprising a container, a sleeve in a fully retracted position, and a lid.
Figure 2:
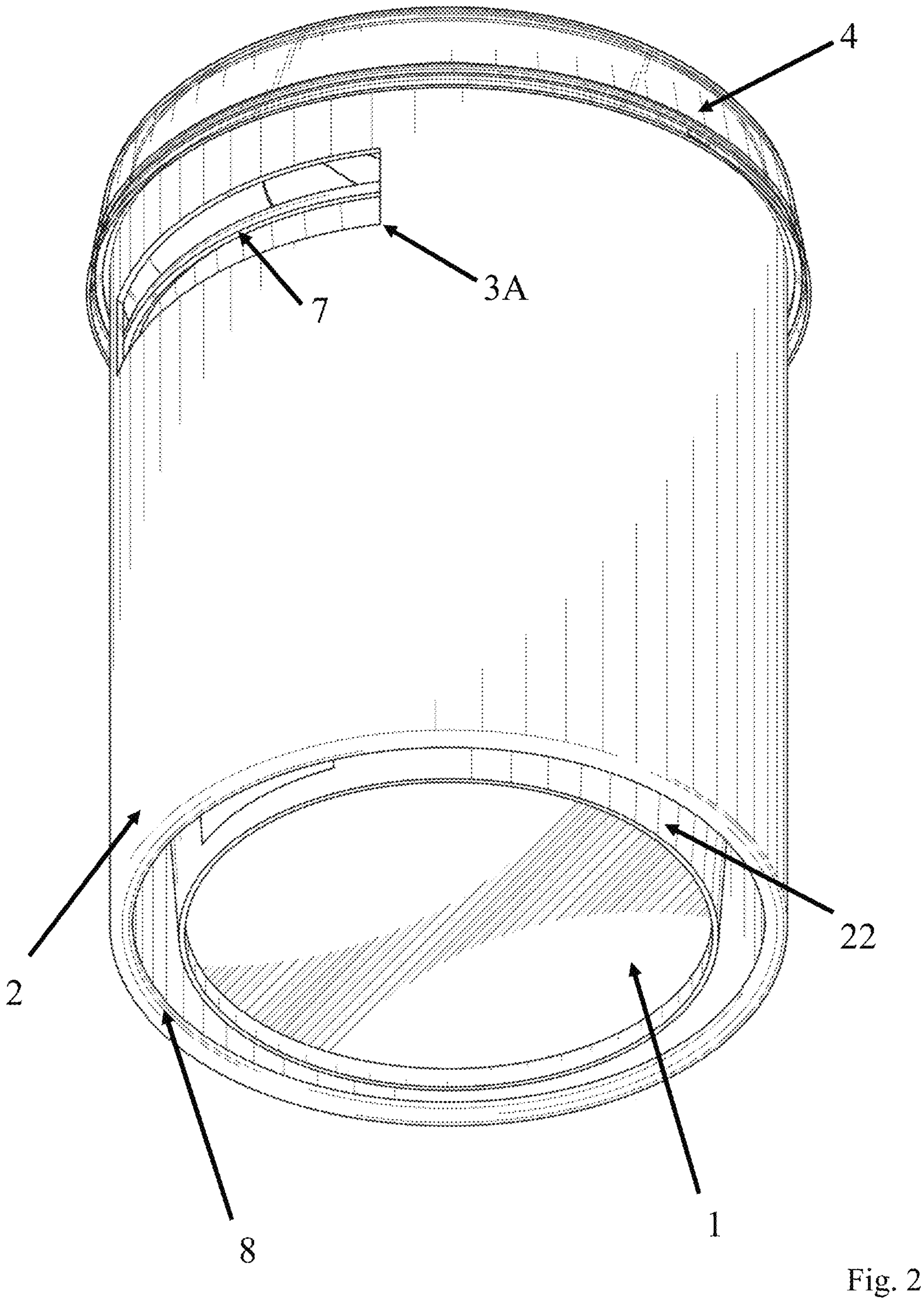
FIG. 2 is a lower perspective view of an embodiment of an Easy Shaker.
Figure 20:
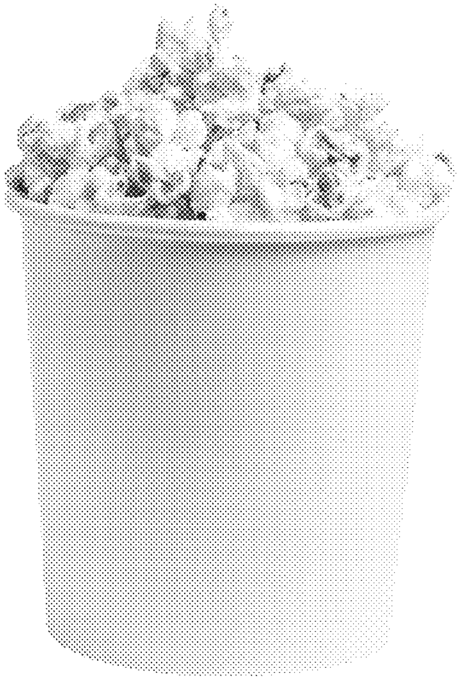
FIG. 20 depicts a bucket with popcorn.
Figure 21:
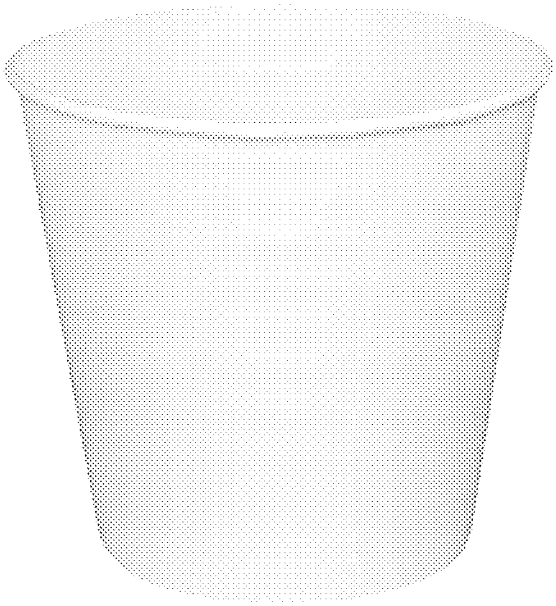
FIG. 21 depicts an empty bucket.

FIGS. 1 & 2 depict an exemplary embodiment of an Easy Shaker comprising a container, sleeve, and lid, the sleeve being in a fully retracted position. In FIG. 1 the container 1 is an inverted conical frustrum (e.g., a truncated cone), a shape often associated with movie popcorn containers colloquially known as a popcorn bucket (e.g., FIG. 20) or buckets or pails (e.g., FIG. 21) generally. The top of the container 1 has an upper ridge 7 which protrudes along the top edge of the container away from the sidewall 22 and away from the interior of the container. (In some embodiments, the upper ridge may protrude away from the side wall (or the plane parallel thereto) into the interior of the container, away from the interior of the container, and/or further upwards in the plane of the sidewall.) A sleeve 2 has a wrap-around sidewall that defines an enclosed space sufficient for all (or in some embodiments, a portion) of the container 1. The sleeve 2 encompasses the container 1 at a horizontal plane that intersects both the sleeve 2 and the container 1 and defines an encompassed space for the container 1 (or a portion of the container). In FIGS. 1 & 2 the sleeve 2 is depicted as being taller than the container 1, but the sleeve 2 may be taller, shorter, or the same size as the container 1. The shape of the container 1 and sleeve 2 need not be conic or circular in cross section, either could have multiple side walls such as with a cuboid or hexagonal or octagonal prism shaped container or sleeve.

The Easy Shaker in FIG. 1 has a sleeve 2 with openings 3A & 3B on opposite sides. The openings may serve as handles for raising and lowering the sleeve 2 with respect to the container. FIG. 1 also depicts a circular and generally cap-shaped pop-on/off lid 4 whose top comprises depressions 5A & 5B. In FIG. 1, the depressions 5A & 5B are shaped like a partial spherical wedge. The shape of the depression facilitates opening and closing of the lip by providing flat vertical surfaces 6A & 6B.

FIG. 2 depicts a lower lip 8 of the sleeve 2 which protrudes or projects inward from the sidewall (or a plane parallel thereto) of the sleeve towards the interior of the sleeve. (In some embodiments, the lower lip may protrude away from the sleeve inward towards the interior of the sleeve, outwards away from the interior of the sleeve, and/or further downwards along a plane parallel to the sidewall.) The lower lip 8 catches on the bottom of the upper ridge 7 of the container 1 as the sleeve is deployed as discussed later with respect to FIG. 7 and others.

The sleeve 2 may be made from plastic, cardboard, paper board, metal, or a combination thereof. FIGS. 1 and 2 depict the sleeve 2 with handle openings 3A & 3B, but projecting handles may be present (on the sleeve 2 or the container 1 or both), a single handle or handle opening, or no handles or handle openings may be present at all. The lid 4 is shown as transparent in some figures, but may be translucent, opaque, or of various colors. The sleeve 2 and container 1 are shown as opaque, but may be transparent, translucent, colored, or have various color(s) or graphical design(s) on their surfaces.

Figure 3:
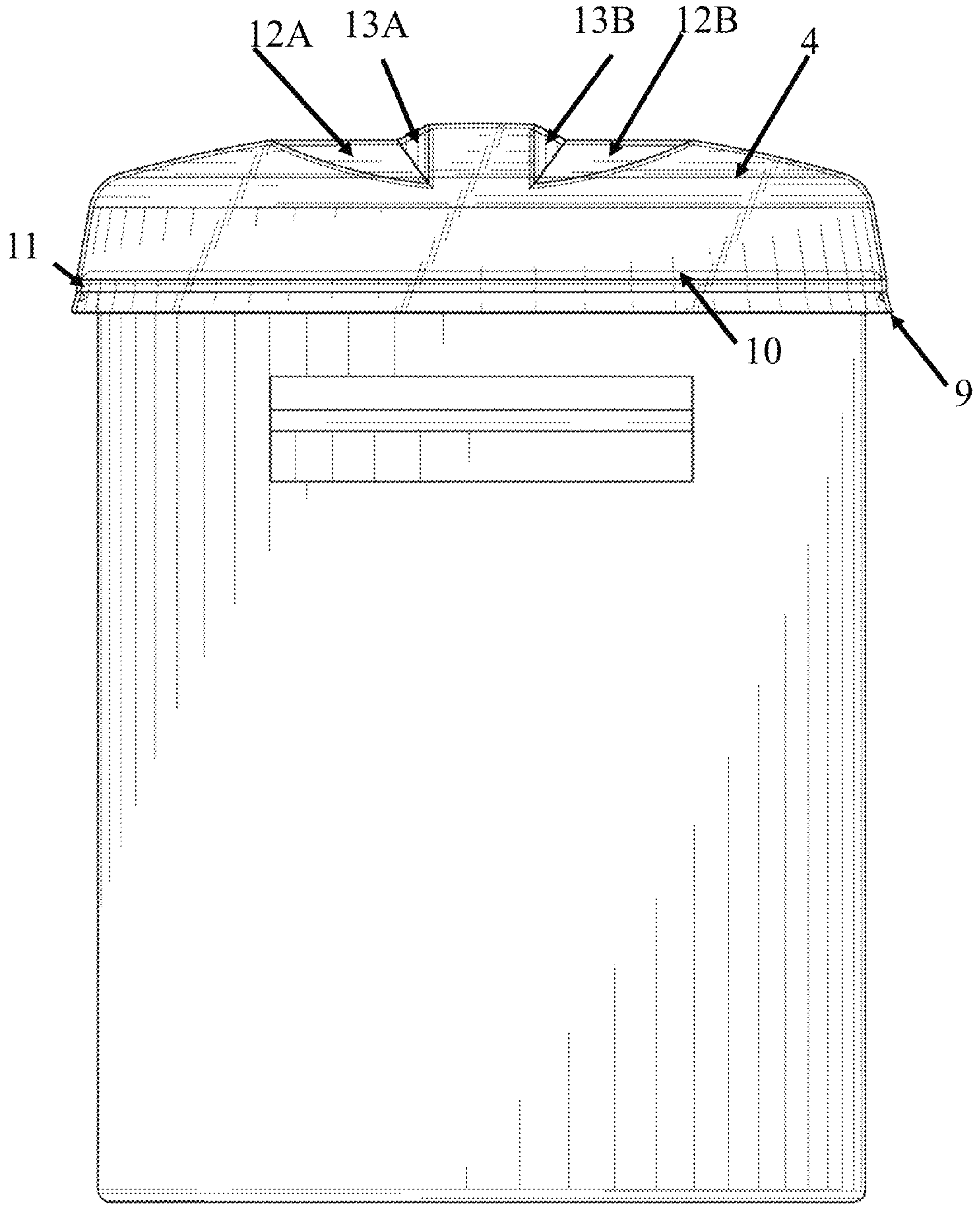
FIG. 3 is a side view of an embodiment of an Easy Shaker.

In FIG. 3, the lid 4 is a pop-on/off lid where minor elastic/temporary deformation and/or an interference fit permits the base 9 of the lid 4 to cover the rim 10 of the sleeve's top and seal at an internal ridge 11 of the lid 4. FIG. 3 depicts an alternative embodiment for lid 4 handles where smaller (as compared to FIG. 1) wedge shaped depressions 12A & 12B create smaller flat surfaces 13A & 13B (e.g., handles) for manipulating the lid or holding the Easy Shaker during shaking. Symmetrical depressions and surfaces on the other side of the container in FIG. 3 are not shown. Handles on the lid may not be needed, for example, if the base 9 of the lid is of sufficient length to serve as a lever for removal.

In some embodiments, the lid may be a screw-on lid where the lower interior of the lid has a female thread to receive a corresponding male threaded ridge on the top of the Easy Shaker sleeve. In some embodiments, the handles may be projecting, e.g., projecting from the top of the cap-shaped lid 4.

Figure 4:
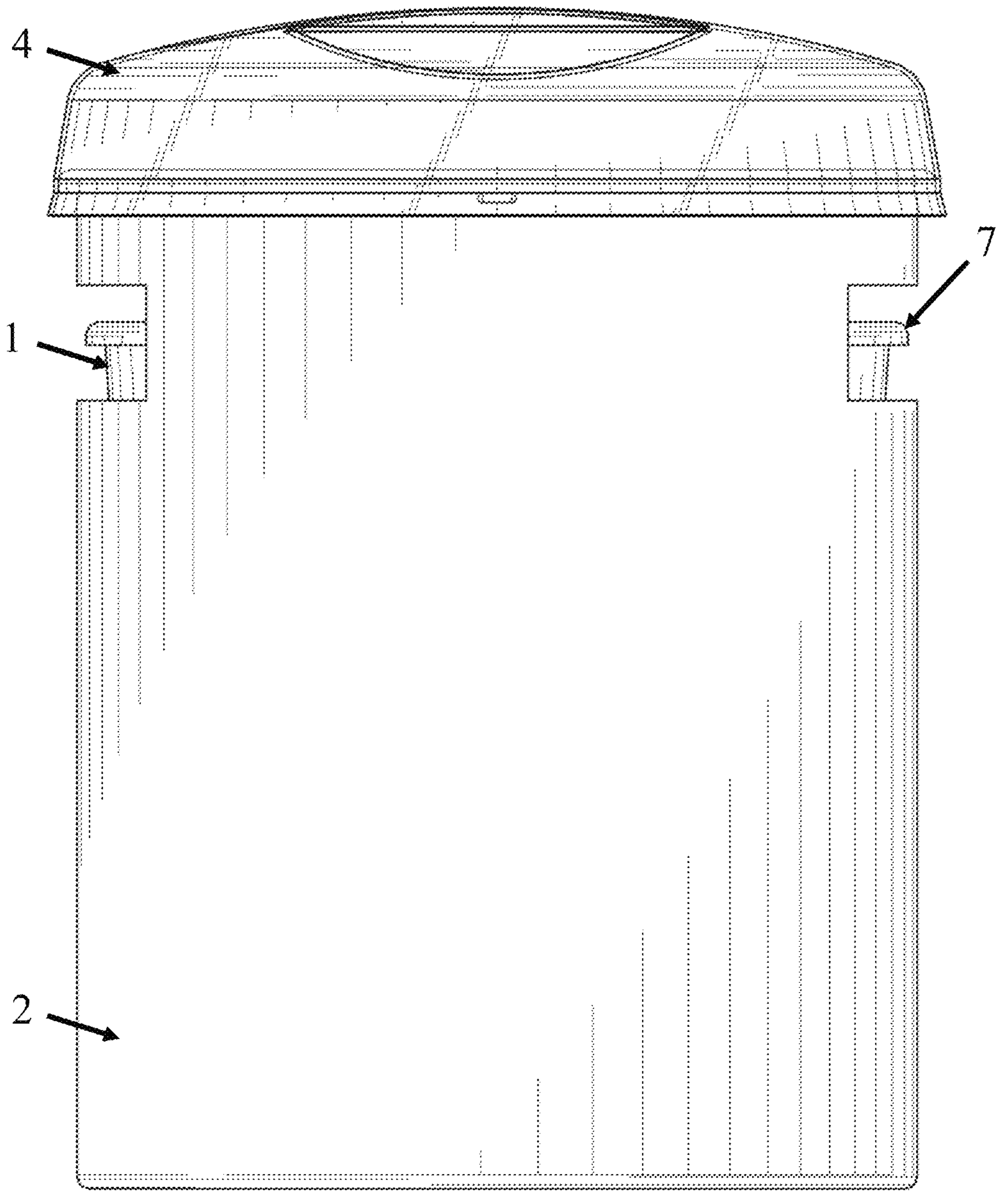
FIG. 4 is a rotated side view of an embodiment of an Easy Shaker.
Figure 5:
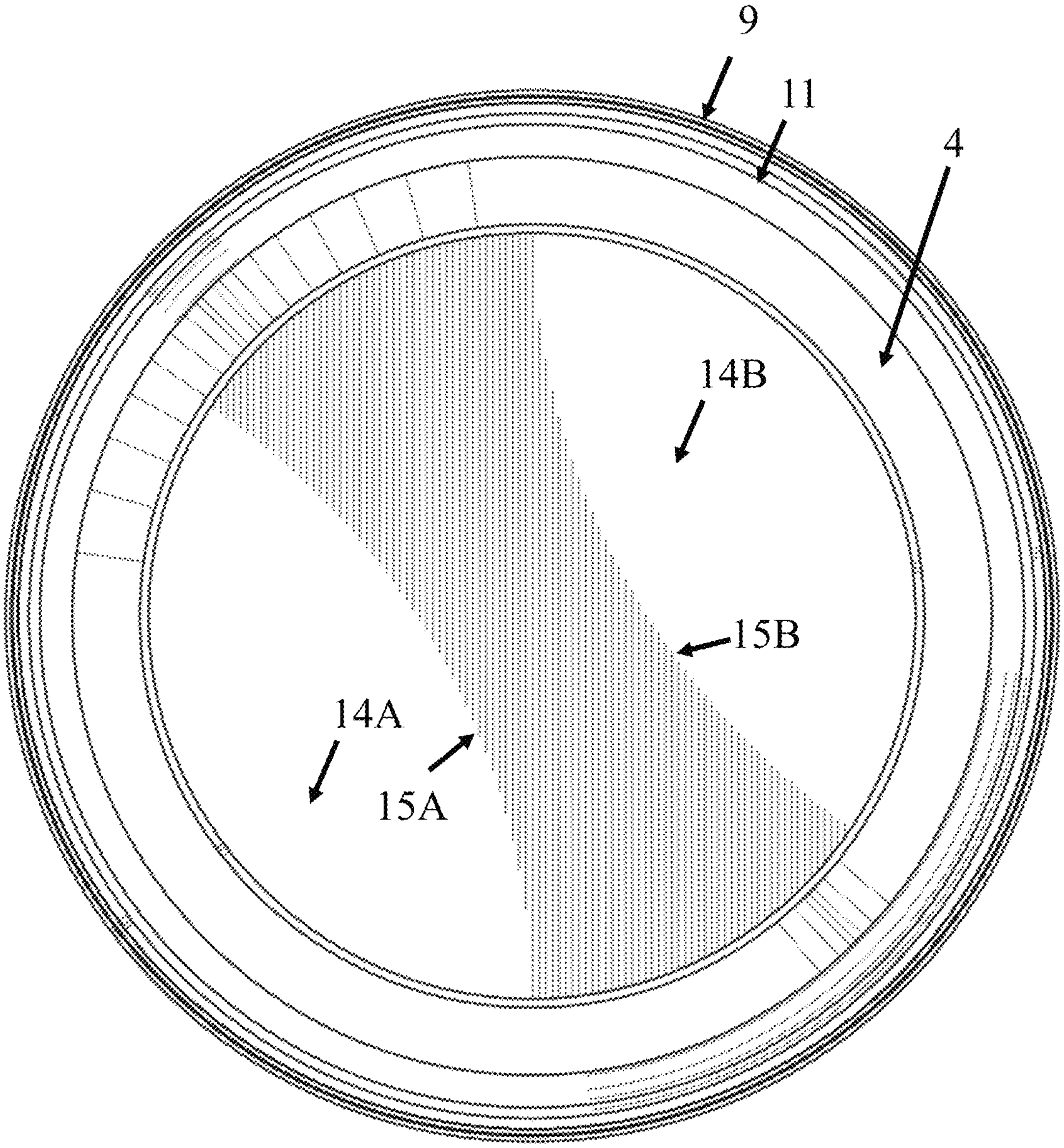
FIG. 5 is a top-down perspective of an embodiment of an Easy Shaker's lid.

FIG. 4 depicts a rotated side view of an embodiment similar to FIG. 1. The upper ridge 7 of the container 1 is visible through the handle openings 3A & 3B. The lid 4 is similar to the embodiment of FIG. 1. FIG. 5 depicts a top-down view of an embodiment of a lid 4 with a base 9, and depressions 14A & 14B that form flat surfaces 15A & 15B for use in manipulating the lid 4.

Figure 6A:
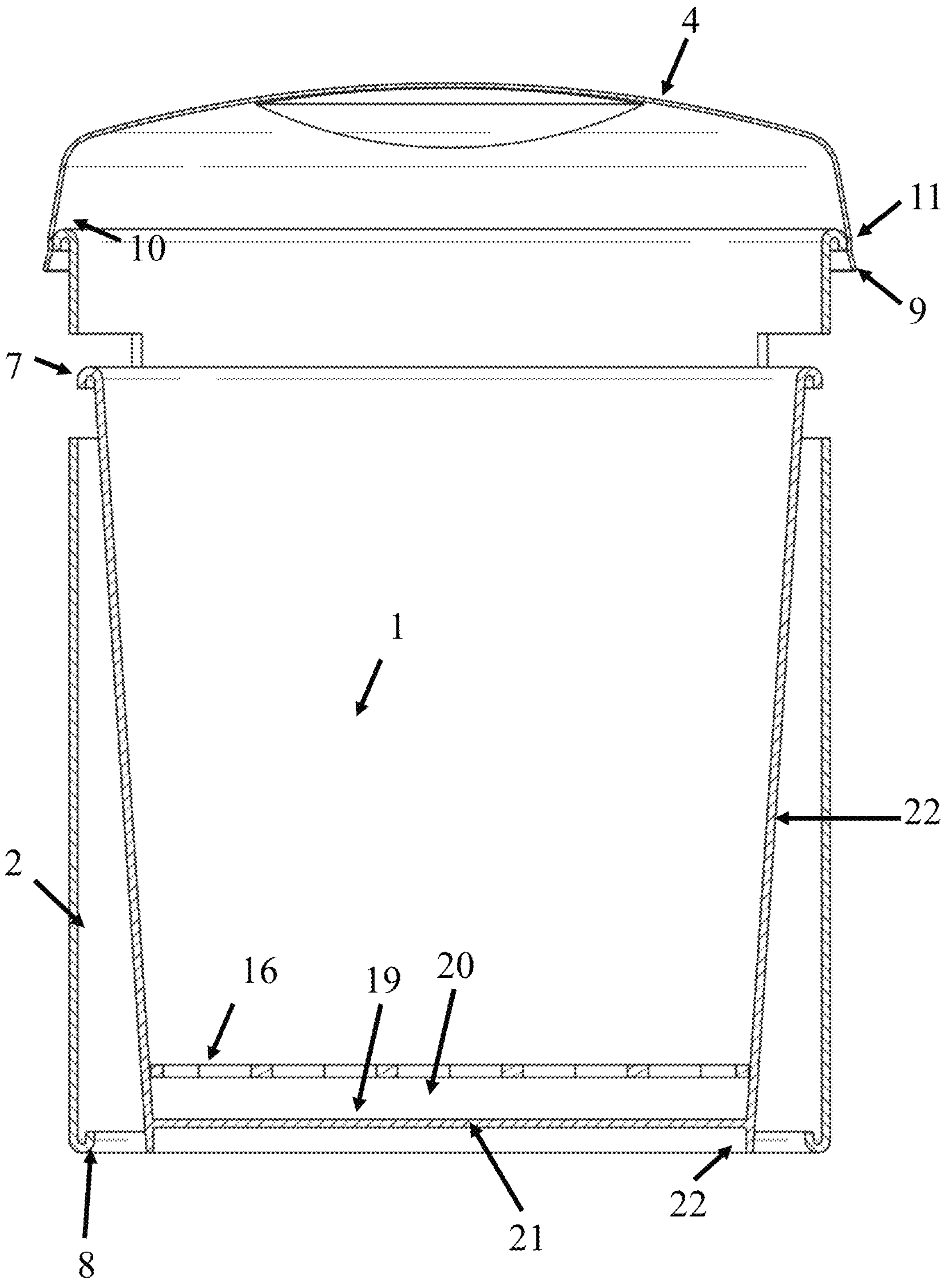
FIG. 6A depicts a cross-section of an embodiment of an Easy Shaker.

FIG. 6A depicts a cut-away view of an embodiment. In this embodiment, the container 1 has an upper ridge 7 in the form of an inverted fishhook or a J. In some embodiments, the upper ridge may be rolled further under or rolled repeatedly so as to be generally ring-shaped (or tubular) similar to FIGS. 20 and 21. The base 9 of the lid 4 covers the rim 10 of the sleeve's 2 top and seals at an internal ridge 11 of the lid 4. The lower lip 8 of the sleeve 2 is shown in the form of a fishhook or a J. In some embodiments, the lower lip 8 may be rolled further under or rolled repeatedly so as to be generally ring-shaped (or tubular). In some embodiments, the lower lip 8 may comprise a bent sidewall projecting inwards. In some embodiments, the upper ridge 7 may be a bent sidewall edge projecting outwards, away from the lower portion of the sidewall and away from the interior of the container.

The embodiment of the container 1 in FIG. 6A also has a grate 16 that rests on the sidewall 22 of the container. In some embodiments, the grate 16 may rest on a lower ridge of the container (not depicted) and/or grate stands or legs (not depicted). The grate 16 and the bottom 19 of the interior of the container define a lower cavity 20. In some embodiments, the grate has no stands and simply rests at the bottom 19 of the container and the height of the grate defines one or more cavities. In some embodiments, grate stands are integrated into the grate. In some embodiments, grate stands are integrated into the container. The side wall 22 of the container 1 extends below the base 21 of the container so that the base of the container is not in direct contact with the surface on which the container rests, but rather the base of the side wall 22 supports the container on the surface.

The grate 16 permits small objects or substances to fall through the grate's grating into the lower cavity 20 where, generally speaking, they are somewhat separated from the other contents of the container. For example, if the container is filled with popcorn, then small pieces of popcorn and/or popcorn kernels may fall below the grating where they will be less accessible to the individual using the container during consumption of the popcorn. In another example, during shaking of the container, seasoning or flavorings may be applied to foodstuffs in the container, and once applied, additional shaking may cause the excess seasonings or flavorings to accumulate at the bottom.

Figure 6B:
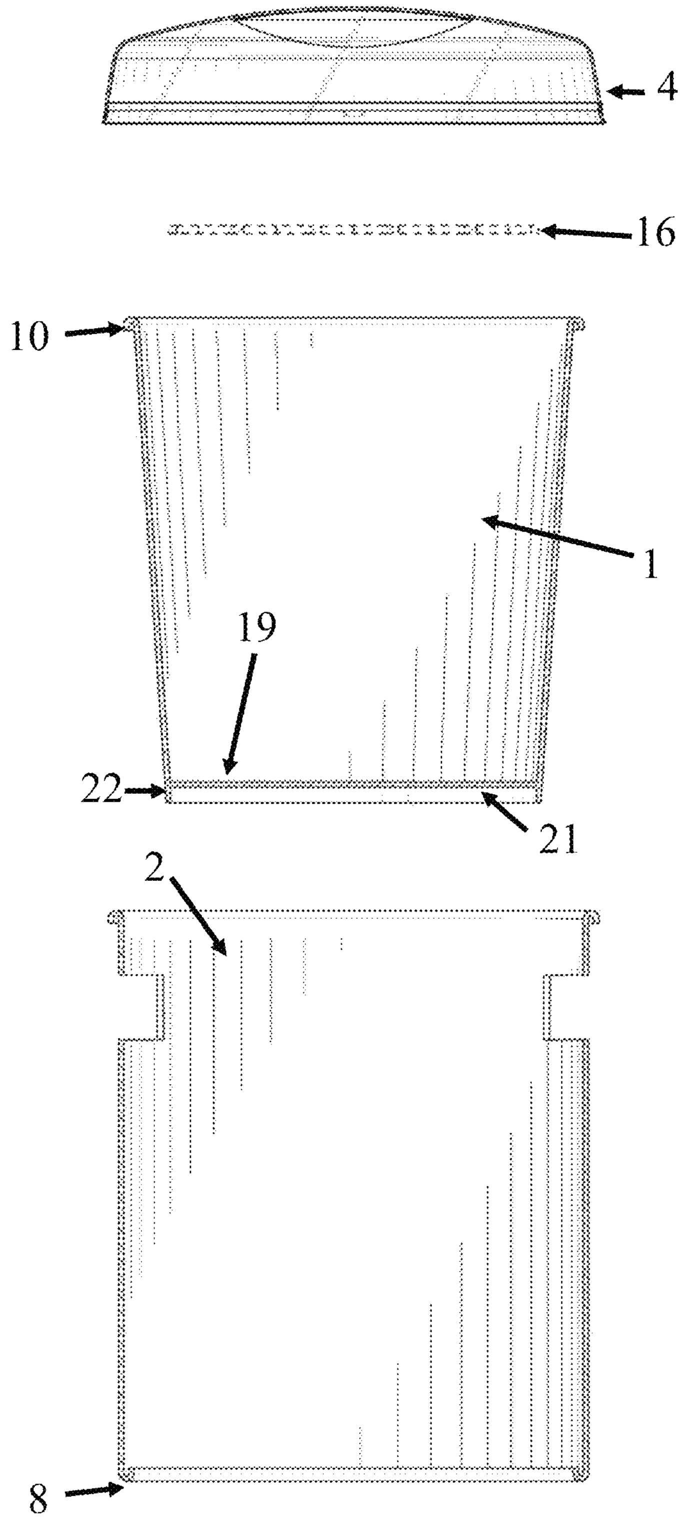
FIG. 6B depicts an exploded cross-section of an embodiment of an Easy Shaker.

FIG. 6B shows an exploded cross-section view of another embodiment with the lid 4, grate 16, container 1, and sleeve 2. The grate 16 rests on the bottom 19 of the container 1 and the height of the grate 16 in conjunction with the grate's grating creates a capture space for kernels, seasonings, and so forth. In other embodiments, the grate 16 may rest above the base 21 of the container 1 along the interior of the container walls 22 at a point where the diameter of the grate and the diameter of the container 1 are approximately the same. The grate need not rest perfectly horizontal or fully at the bottom to be effective.

Figure 7:
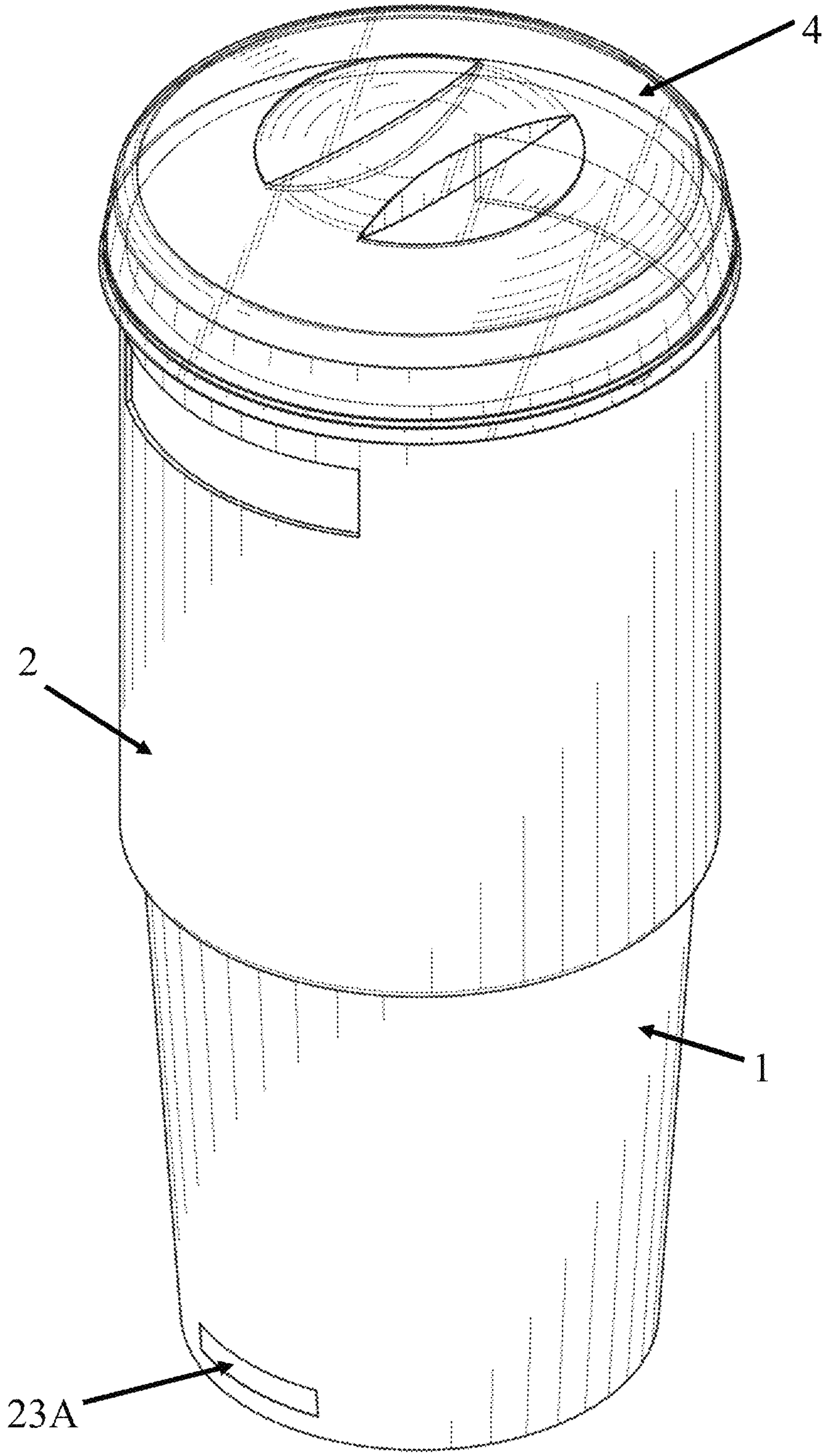
FIG. 7 is an upper perspective view of an embodiment of an Easy Shaker with a sleeve in a deployed position.
Figure 8:
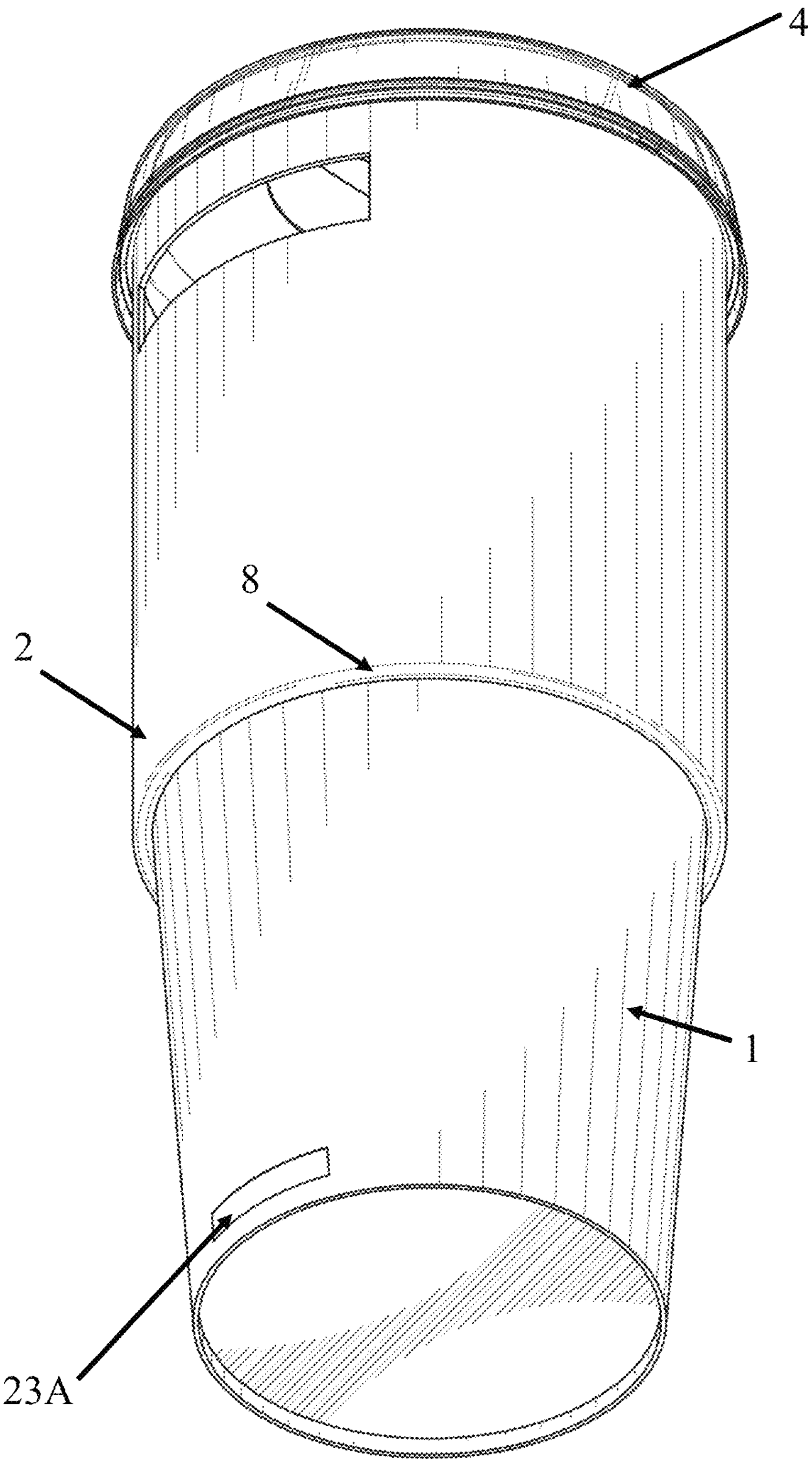
FIG. 8 is a lower perspective view of an embodiment of an Easy Shaker with a sleeve in a deployed position.
Figure 9:
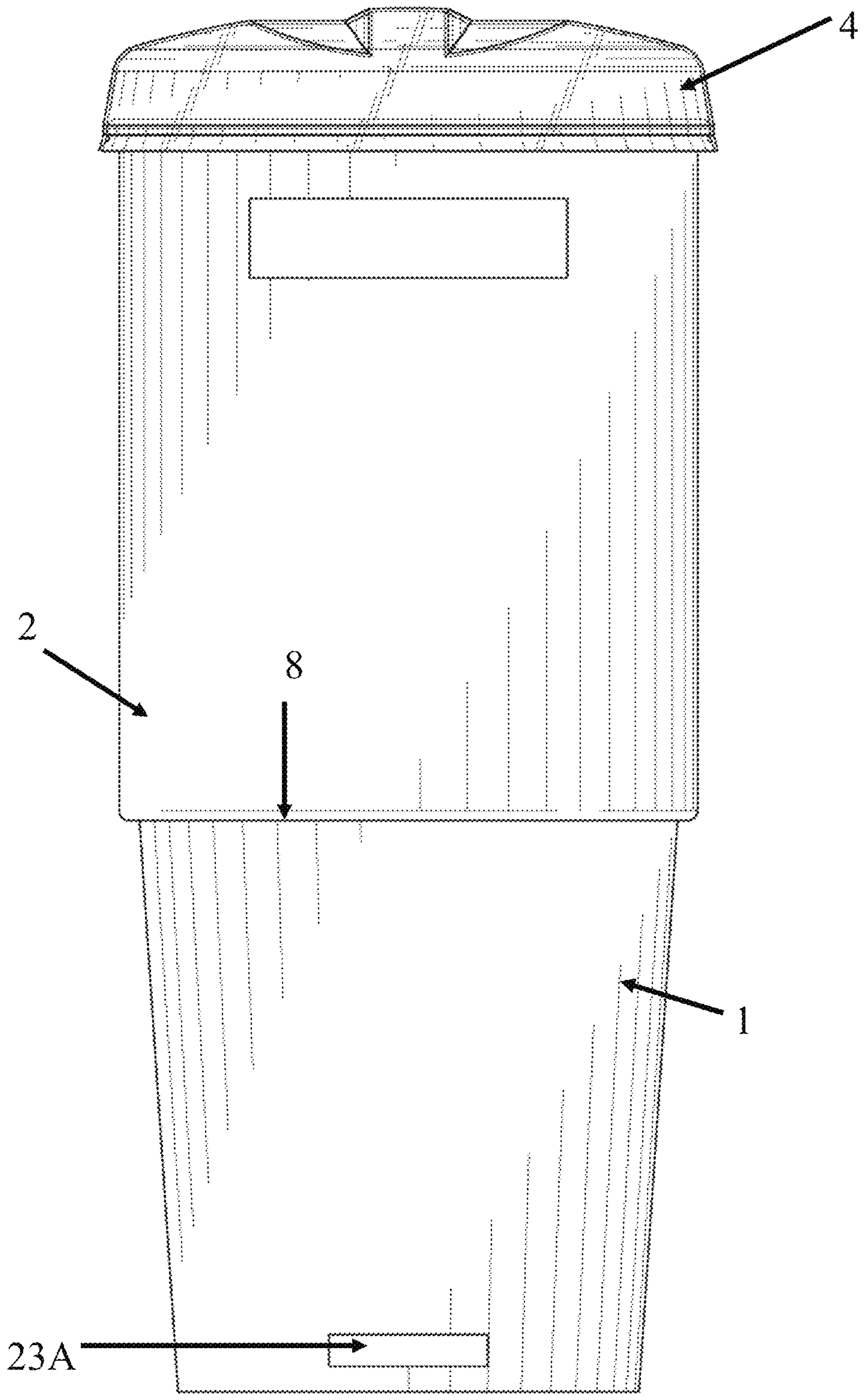
FIG. 9 is a side view of an embodiment of an Easy Shaker with a sleeve in a deployed position.
Figure 10:
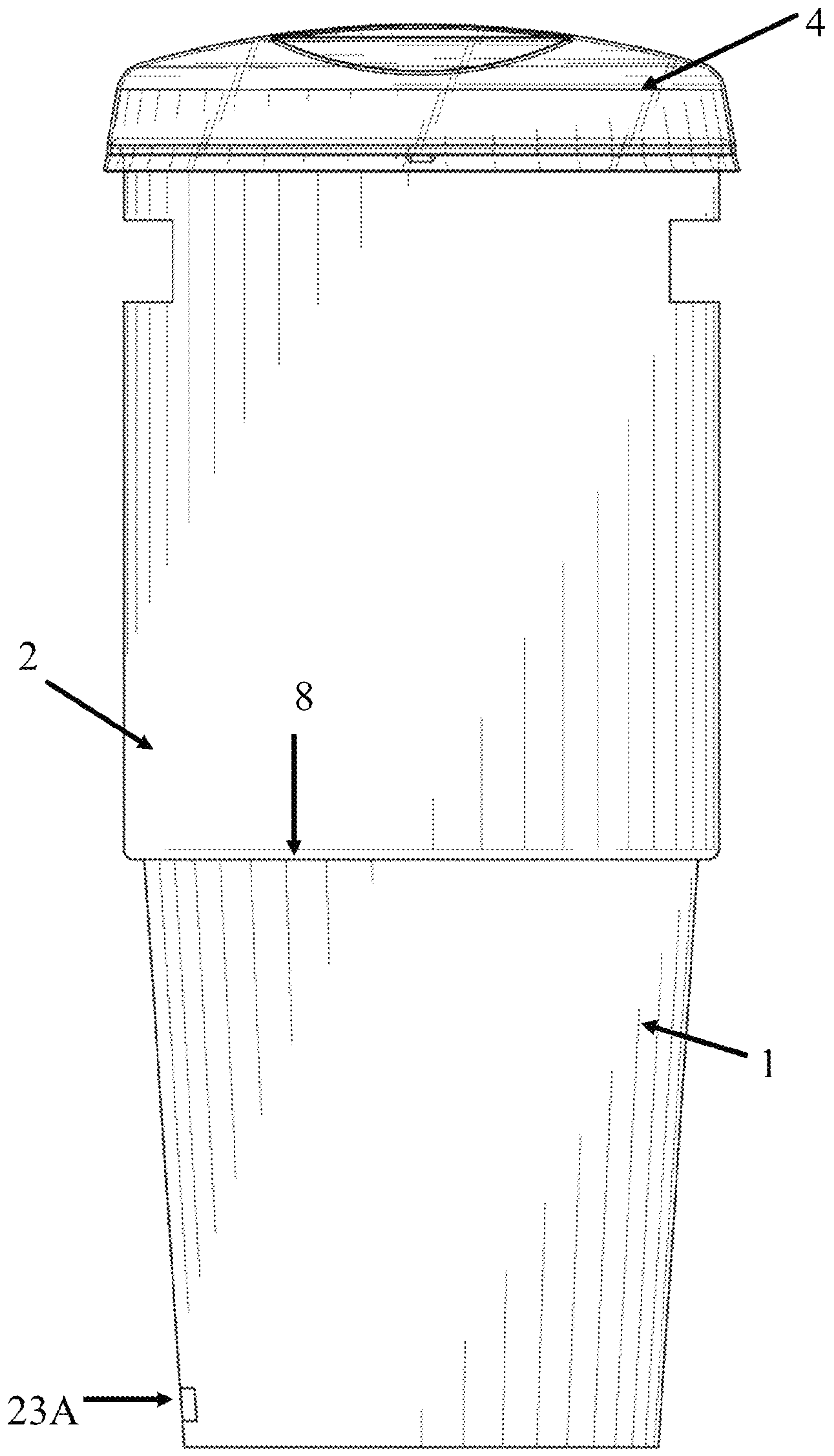
FIG. 10 is a rotated side view of an embodiment of an Easy Shaker with a sleeve in a deployed position.

FIGS. 7-10 depicts various embodiments of the sleeve 2 in a raised, deployed position with respect to the container 1 where FIG. 7 is an upper perspective view, FIG. 8 is a lower perspective view, and FIGS. 9-10 are side views. FIGS. 8-10 show the lower lip 8 of the sleeve engaged or interfacing with the upper ridge 7 (not visible) of the container 2. When raised to the deployed position, the lower lip of the Easy Shaker's sleeve 2 engages or interfaces with the upper ridge 7 of the Easy Shaker's container 1 so as to stop further upward movement of the sleeve 2.

In some embodiments, an interference fit between the upper ridge 7 of the container 1 and the lower lip 8 of the sleeve 2 secures the sleeve 2 and the container 1 in a deployed position. In some embodiments, a friction fit between the lower lip 8 and the container 1 near upper ridge 7 secures the sleeve 2 and the container 1 in a deployed position, with the upper ridge 7 acting as a backstop to further upward travel of the sleeve 2. In some embodiments, the sleeve 2 may move along the container 1 between a fully deployed position and a fully retracted position during shaking or mixing of foodstuffs in the container. Depending on the manipulation of the Easy Shaker, the sleeve 2 may, in some embodiments, move between (1) a fully deployed position and a partially deployed position, (2) two partially deployed positions, and/or (3) a fully retracted position and a partially deployed position. In some embodiments the sleeve 2 may pass beyond a fully retracted position wherein the bottom of the sidewalls of the container 1 are above the lower lip 8 of the sleeve 2. In some embodiments, the sleeve 2 may remain in a fully deployed position during shaking.

Figure 11:
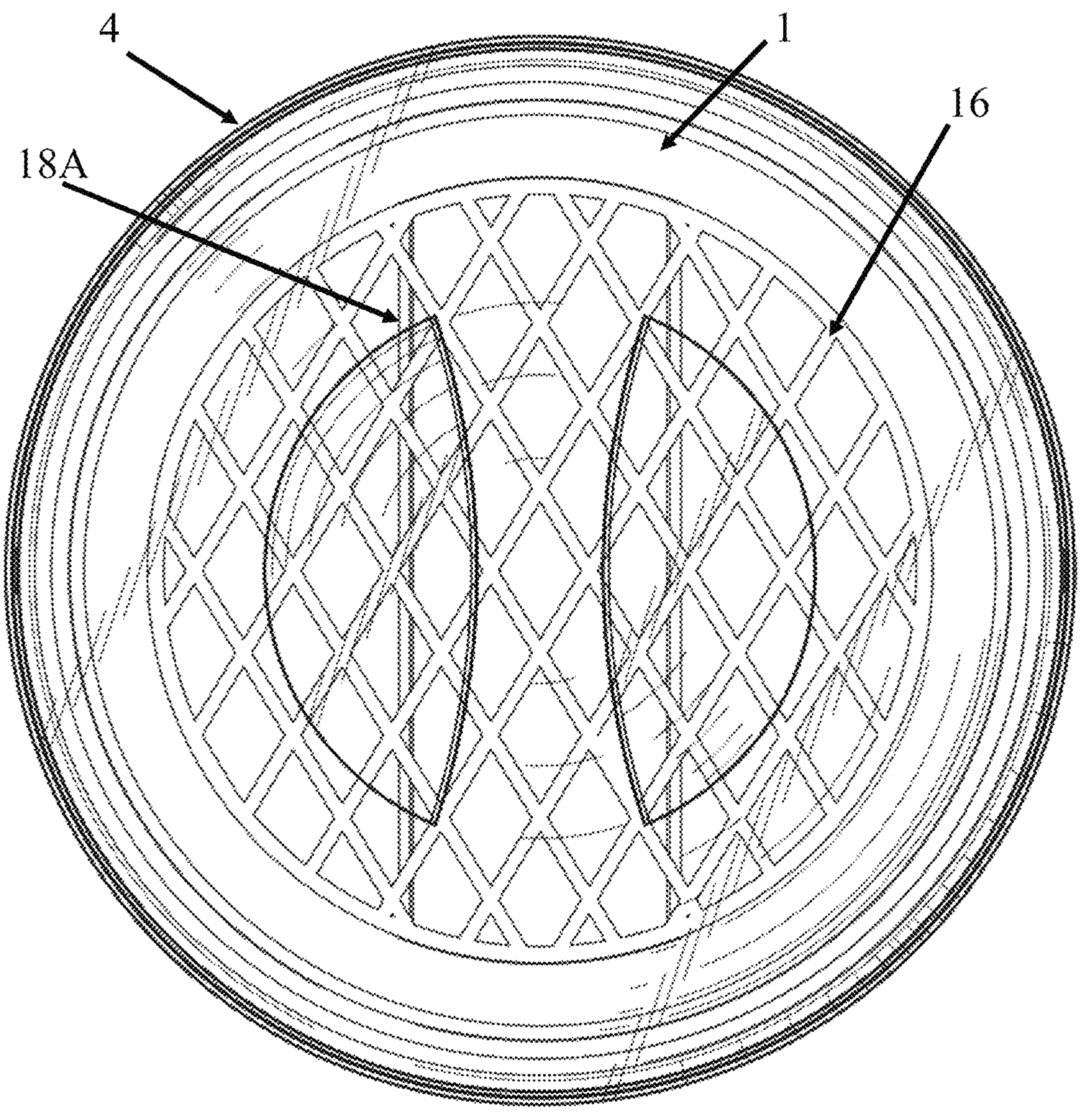
FIG. 11 is a top-down view through a translucent lid of an embodiment of an Easy Shaker.
Figure 12:
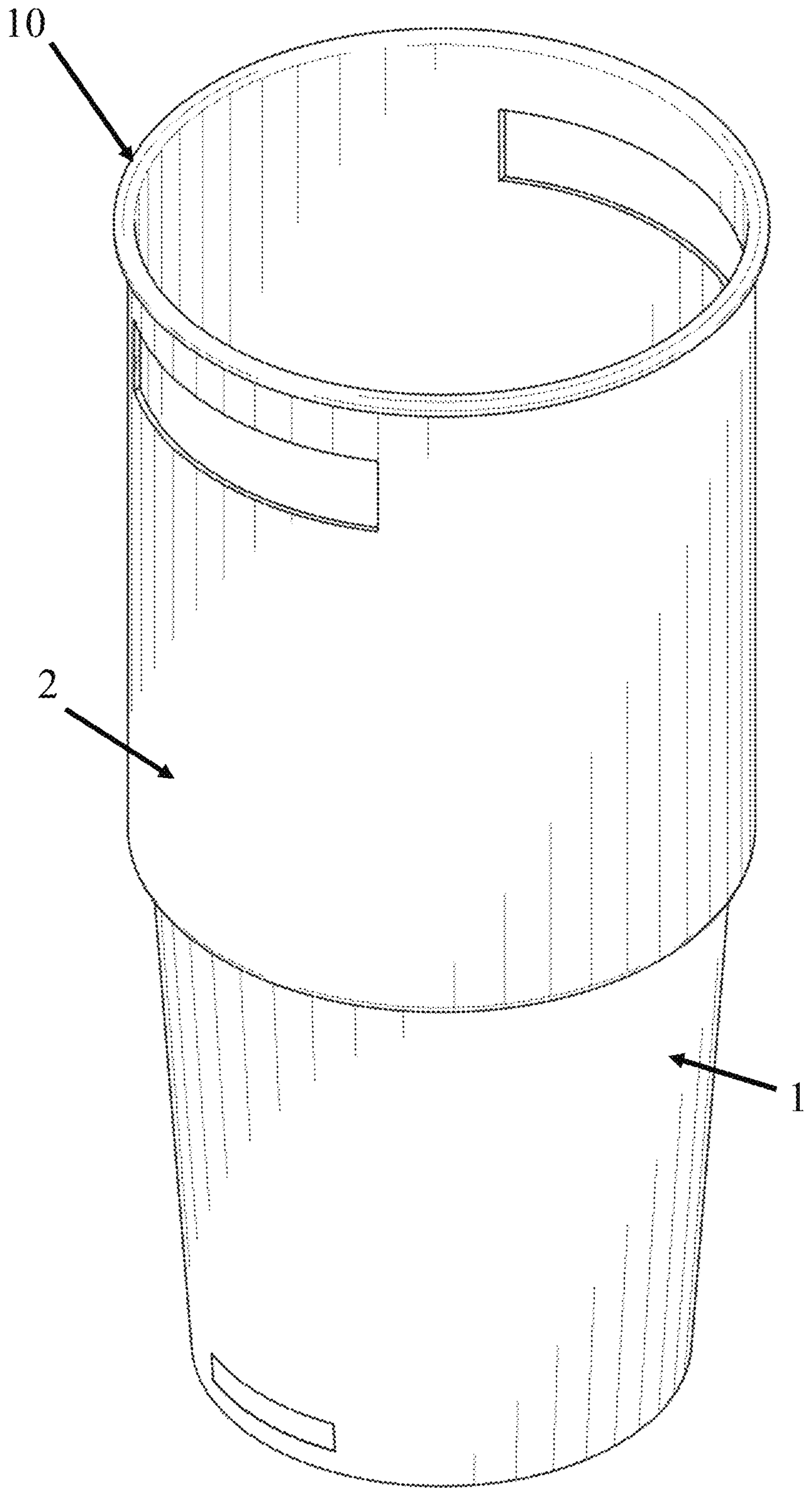
FIG. 12 is a perspective view of an embodiment of an Easy Shaker.

FIG. 11 depicts a top-down view of an embodiment through a translucent lid 4. The grate 16 and an embodiment of grate stands 18A are visible at the bottom of the container 1. FIG. 12 depicts an embodiment where the Easy Shaker sleeve 2 is raised and deployed with respect to a container 1. In this embodiment, no lid is present, exposing the rim 10 of the sleeve.

In an exemplary use case for popcorn with respect to FIGS. 1-12 and similar embodiments, popped popcorn may be placed into the container 1. The quantity of popcorn may be less than, or may exceed, the upper ridge 7 of the container. Where a greater volume of popcorn than can be securely held by the container 1 is desired, the sleeve 2 may be deployed similar to FIG. 12 prior to placing the popcorn into the container 1. Either before or after filling the container 1 with popcorn, the sleeve 2 may be deployed such that, in one example, the upper ridge 7 of the container 1 engages or interfaces with (and/or backstops) the lower lip 8 of the sleeve 2.

At some point, seasonings such as butter and salt may be provided, in this example, butter and salt are added after filling the container 1 with popcorn. However, seasonings may be provided prior to providing the popped popcorn or provided in stages. The sleeve 2 and container 1 may then be shaken so as to mix the popcorn, butter, and salt.

In one form of shaking, the handles (e.g., 3A and/or 3B) on the sleeve may be held while shaking such that the container 1 moves up and down with respect to the sleeve 2. In such a case, the lower lip 8 of the sleeve 2 prevents the upper ridge 7 of the container 1 from further downward movement. In other forms of shaking, the sleeve 2 and the container 1 may not move with respect to each other, the sleeve 2 acting as an extension of the container with the lower lip 8 of the sleeve 2 being held by, for example, a friction fit to the upper ridge 7 of the container 1.

In some cases, the lid 4 may be used to cover the popcorn prior to, during all, or during part of the shaking. The lid 4 may also be used to keep the popcorn covered for storage or transport. In some use cases the sleeve 2 may then be retracted. In cases where the popcorn (or other product) exceeds the volume of the container 1, the Easy Shaker sleeve 2 may remain deployed. Kernels and smaller pieces of popcorn may be recovered from beneath (or from inside) the grate 16 after the popcorn has been sufficiently consumed or removed from the container 1.

Figure 13:
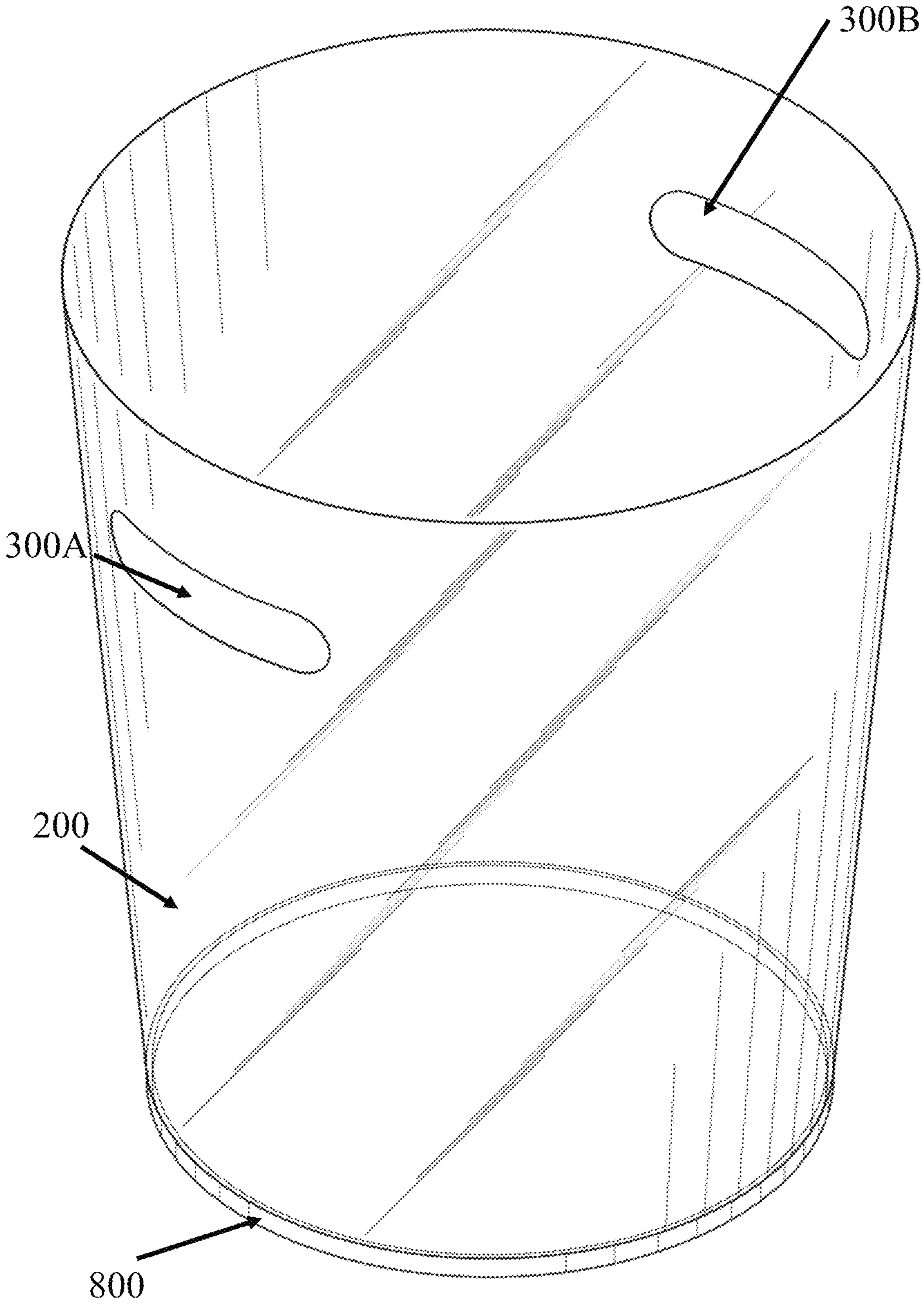
FIG. 13 depicts, from a perspective view, an alternative embodiment of an Easy Shaker.
Figure 14:
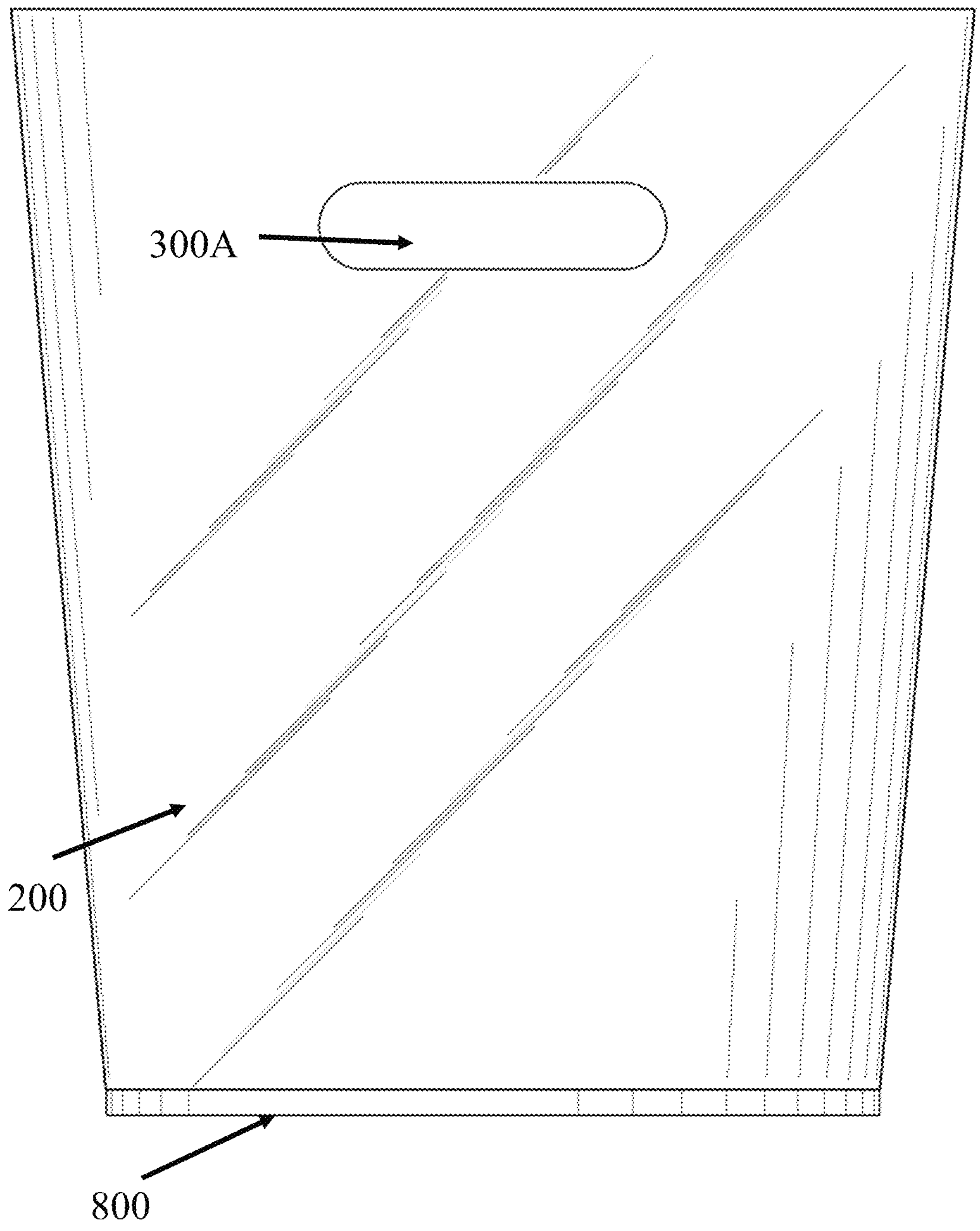
FIG. 14 is a side view of an alternative embodiment of Easy Shaker.
Figure 15:
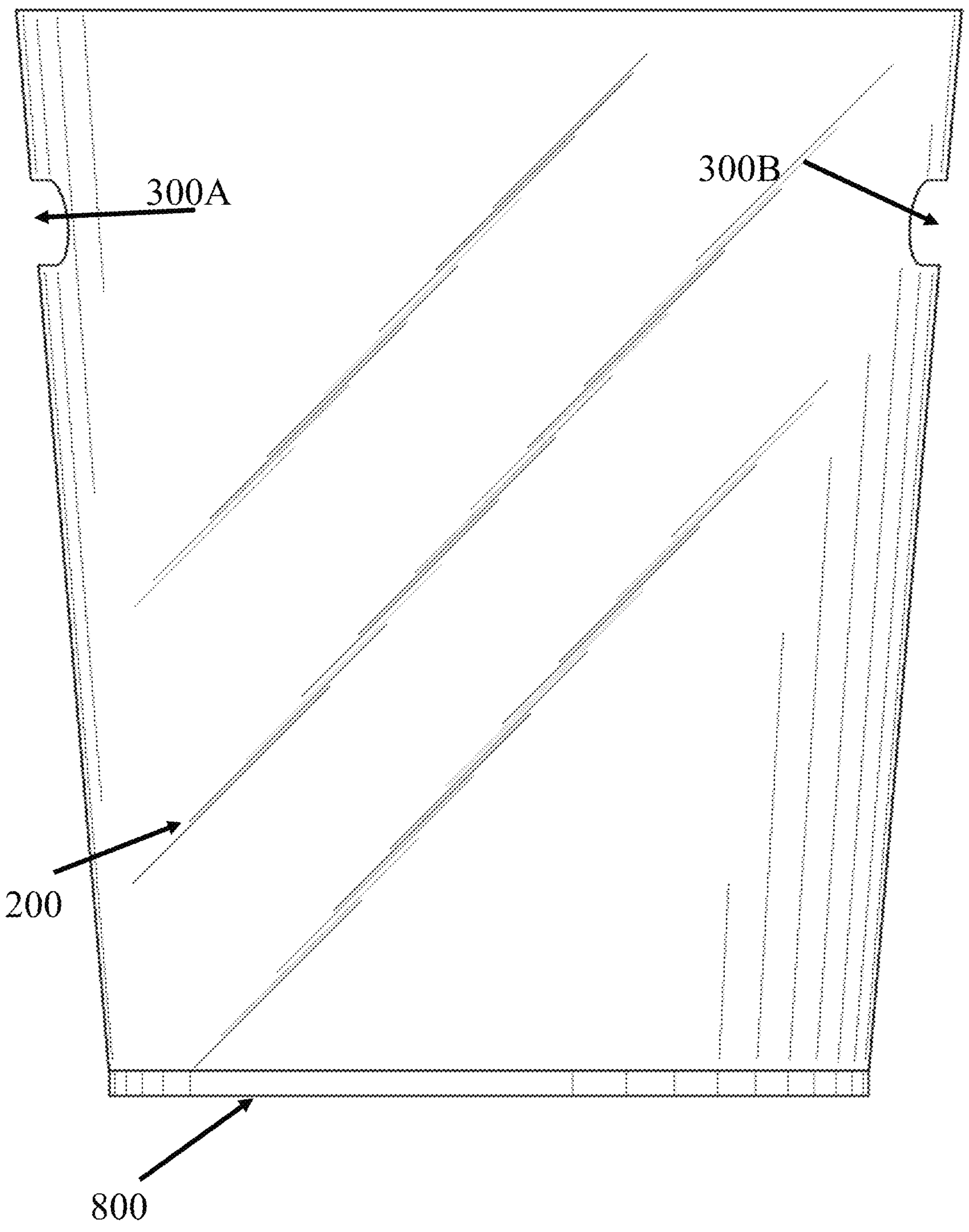
FIG. 15 is a rotated side view of an alternative embodiment of Easy Shaker.

FIG. 13 depicts a perspective view of another embodiment of an Easy Shaker. The sleeve 200 has handle openings 300A and 300B and a lower lip or edge comprising an elastic band 800. FIGS. 14 and 15 depict side views of an Easy Shaker sleeve 200 with handle openings 300A and 300B and a lower edge comprising an elastic band 800. In some embodiments, one handle opening or no handle openings are present.

Figure 16:
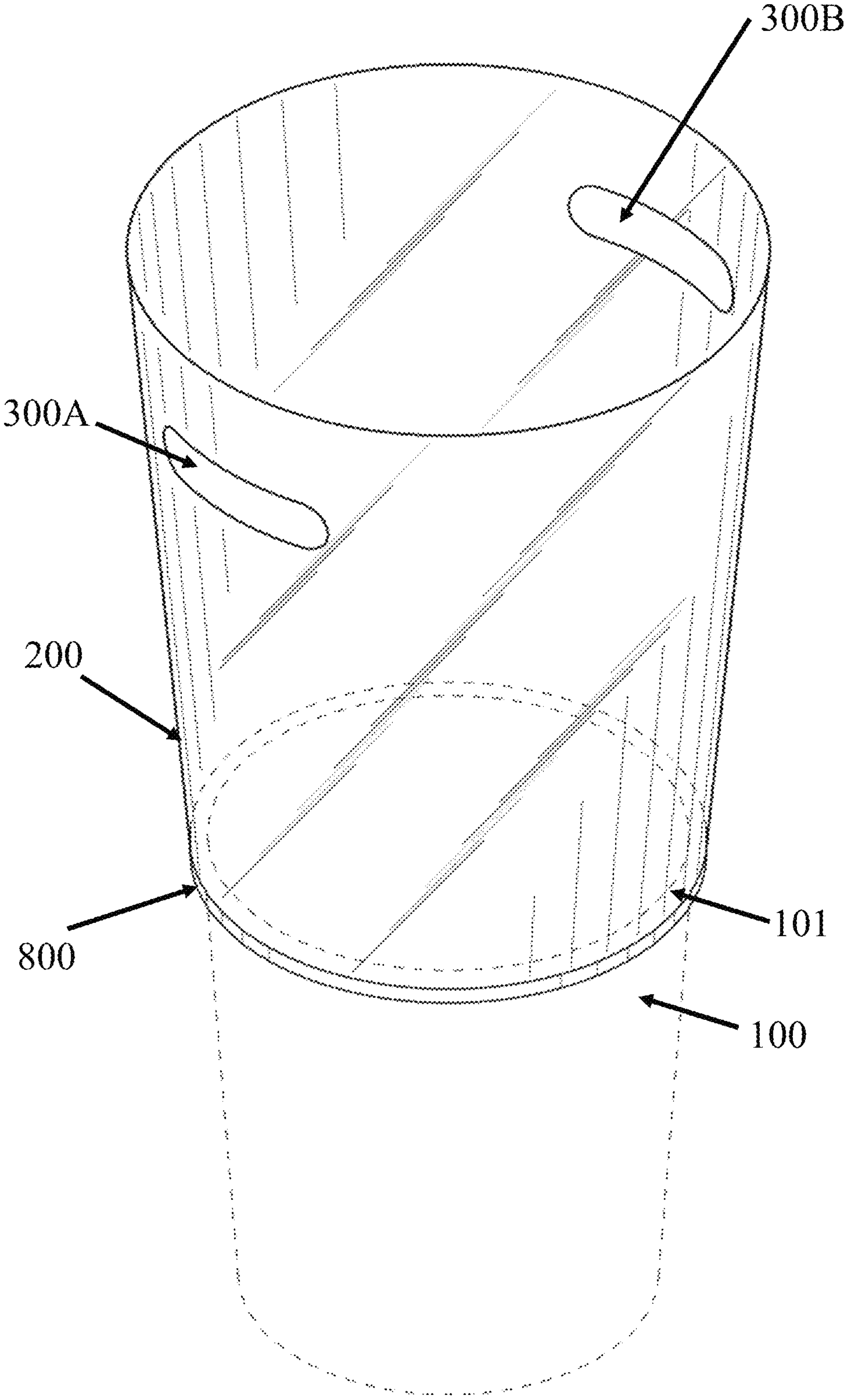
FIG. 16 is an upper perspective view of an alternative embodiment of Easy Shaker deployed on a container.

FIG. 16 depicts an embodiment of the Easy Shaker sleeve 200 deployed on a container 100 with a top ridge 101. In some embodiments, the sleeve 200 is made of a thin, flexible plastic similar to that used for plastic bags. In some embodiments, the sleeve 200 may be rigid plastic. An elastic band 800 is used to secure the lower edge of the sleeve 200 to the top of a container 100 at or below the top ridge 101. In some cases, the top ridge 101 acts as a backstop to prevent the elastic band from sliding off the top of the container 100. In some cases, the elastic band has enough compressive force, in conjunction with friction forces, to secure the sleeve 200 to the container 100 without interacting with the top ridge 101.

In an exemplary use case with respect to FIGS. 13-16 and similar embodiments, popped popcorn may be placed into the container 100. The quantity of popcorn may be less than, or may exceed, the top ridge 101 of the container 100. Either before or after filling the container 100 with popcorn, the sleeve 200 may be deployed such that the elastic band 800 is placed around the container 100 prior to placing the popcorn into the container 100.

At some point, seasonings such as butter and salt may be provided, in this example, butter and salt are added after filling the container 100 with popcorn. However, seasonings may be provided prior to providing the popped popcorn or provided in stages. The sleeve 200 and container 100 may then be shaken so as to mix the popcorn, butter, and salt. In some use cases the sleeve 200 may then be removed or lowered. In cases where the popcorn (or other product) exceeds the volume of the container 100, the sleeve 200 may remain deployed. Kernels and smaller pieces of popcorn may be recovered from beneath (or from inside) a grate (e.g., one similar to grate 16 in FIG. 6B) after the popcorn has been sufficiently consumed or removed from the container 100.

Similar steps for the above methods would be applicable likewise with respect to salads and salad dressings and/or salad toppings, meats (e.g., shrimp, fish, pork, beef, chicken) and batters and/or seasonings, and other foodstuffs for which seasoning or shaking (e.g., to sort or capture some portion thereof) is desired. While the preceding embodiments have been described in the context of mixing foodstuffs, the invention is not so limited, and may be used in other circumstances to mix or apply coatings to various other things like, for example, mixing soils or coating machine parts such as screws or bolts with oil or powder coatings.

NFT and the Easy Shaker

One of the more significant technologies that is changing the way humans interact is blockchain technology. A blockchain is a growing list of records, called blocks, that are linked together using cryptography. In a typical example, each block contains a cryptographic hash of the previous block, a timestamp, and transaction data. The timestamp proves that the transaction data existed when the block was published in order to get into its hash. Blocks contain the hash of the previous block, forming a chain, with each additional block reinforcing the ones before it. As such, blockchains are resistant to modification of their data because once recorded, the data in any given block cannot be altered retroactively without altering all subsequent blocks.

Two popular blockchains are presently Ethereum and Bitcoin. In those blockchains, the blockchain comprises a distributed ledger managed by a peer-to-peer (P2P) computer network for use as a public distributed ledger. Nodes in the network collectively adhere to a consensus algorithm/protocol to add and validate new transaction blocks.

A non-fungible token, or "NFT", is a unit of data stored on a digital ledger, e.g., a blockchain, that contains digital information about a certain object. The object may be tangible, such as a piece of land, a vehicle, a coin, a painting, or a printed photograph. The object may be intangible, such as a digital image, a financial security, multimedia footage, or a wide range of digital files. The object may also comprise both tangible and intangible portions. An NFT functions like a cryptographic token, but unlike cryptocurrencies such as Bitcoin, the tokens are not mutually interchangeable, in other words, not fungible.

NFTs are created (or "minted") when a record is added to (or recorded in) a blockchain, the record comprising a cryptographic hash and other metadata concerning the NFT (see, for example, Ethereum ERC-1155's Metadata URI JSON Schema which provides a structure for storing NFT descriptive information). The record is linked with previous records, and future records link to the record concerning the NFT, thereby creating a chain of identifiable data blocks. This cryptographic transaction process ensures the authentication of each digital record by providing a digital signature that is used to track NFT ownership. While copies of digital items to which the NFT refers to may be available for anyone to obtain, the NFTs are tracked on blockchains to provide the owner with proof of ownership.

Various types of blockchain support NFTs. Currently, the largest and most common blockchain for NFTs is the Ethereum blockchain which supports the ERC-721 standard-a data standard for creating non-fungible tokens within smart contracts. (The Ethereum blockchain also supports other standards such as ERC-998 which defines a token able to have tokens within itself to simplify transactions of multiple tokens in one transaction.) An NFT may be identified on the Ethereum blockchain with a pair of datum comprising a "contract address" and a "tokenId". With these two pieces of information, a user may query the Ethereum blockchain to obtain the corresponding information for a specific NFT.

Smart contracts implemented on the Ethereum blockchain permit NFTs to be transferred from one owner to another, or put more technically, from one "address" to another. In the Ethereum network, there are two major types of addresses: Externally Owned Addresses ("EOA") and Contract Addresses. An EOA is an address which is controlled by a person or entity external to the Ethereum blockchain. An EOA is typically used as a destination to send "Ether" to or from. (Ether is the formal name for the cryptocurrency associated with the Ethereum blockchain.)

A user of the Ethereum blockchain will typically have a "wallet" which comprises, among other things, public and private cryptographic keys associated with an EOA that allow the user to control Ether and other data that are associated with an EOA. The user's wallet may reside on their computer (e.g., desktop or smartphone) or a separate storage device (e.g., a portable flash drive) in a situation called a non-custodial wallet or self-custody wallet. The user typically will use a wallet application (e.g., MyCrypto, MyEtherWallet, Ledger Live) to access the wallet, with the application serving as an interface between the user, the wallet, and the blockchain to perform transaction with respect to the EOA the wallet corresponds to. Some users may use online services such as Coinbase or Gemini which support custodial wallets stored on third-party servers with the user having access through the internet (typically a web browser) to a website (or interface) provided by that third-party which website then provides access to the wallet.

Contract Addresses are where smart contracts reside. "Smart contracts" are obligations tied to a computer protocol intended to digitally facilitate, verify, or enforce the negotiation or performance of transactions with minimal reliance, if any, on third parties. These transactions may be trackable and may be irreversible. Some recent interpretations of "smart contract" are used more specifically in the sense of computation that takes place on a blockchain or distributed ledger. In this interpretation, used for example by the Ethereum Foundation, a smart contract is a computer program whose instructions are supported by the Ethereum blockchain network. Bitcoin also provides a script language that allows the creation of custom smart contracts on top of Bitcoin like multi-signature accounts, payment channels, escrows, time locks, atomic cross-chain trading, oracles, or multi-party lottery with no operator. Smart contracts for NFTs on the Ethereum blockchain typically comply with ERC-721 (on in the case of contracts implementing one or more of NFTs and fungible tokens, ERC-1155, or in the case of contracts implementing fungible tokens, ERC-20 and ERC-777). This permits the tracking of NFT ownership and the transfer of an NFT from one EOA to another EOA using defined operations.

Bitcoin is compatible with various tokens, some tokens using similar specifications to the Ethereum standards such as BRC-20 which utilizes the Ordinals protocol's inscriptions of JSON data to deploy, mint, and transfer tokens.

In a preferred embodiment of the present invention, the Easy Shaker is a collectible apparatus that has information linking or associating the Easy Shaker product (directly or indirectly) to a NFT (or in some embodiments, a fungible token). In one embodiment, a user may purchase or otherwise obtain an Easy Shaker (a sleeve/container/lid combination, or a permutation of one or two of the three—e.g., a sleeve or container or lid; a sleeve and container; a sleeve and lid; a container and lid) through a website (e.g., an online ecommerce platform such as Amazon.com) or other internet locale (e.g., a platform such as the Metaverse) or in the physical world (e.g., at a movie theater, club, store, concert venue, sports event, promotional venue, or at a some arbitrary location).

In one embodiment, with reference to FIG. 7, the Easy Shaker sleeve 2, the container 1, and/or lid 4, may have a barcode, serial number, or other information ("token linking information" or TLI) associated therewith by printing or affixing the information on the interior, exterior, side, bottom, or top thereof. In some embodiments, the TLI is associated with the Easy Shaker by way of an additional object (that is also associated with the Easy Shaker) having TLI included therewith such as an instruction manual, a card, a physical token, a game piece, a toy, or a piece of printed matter (e.g., a cardboard sleeve similar to ones used for holding coffee cups and adapted to a popcorn bucket). The token linking information may be human readable or may be encoded in a digital format such as a two-dimensional data matrix (e.g., QR code or PDF417 formats) or a linear barcode (e.g., Code 128, UPC, Codabar, or EAN-8 formats). In some embodiments, the Easy Shaker may have a radio frequency identification tag ("RFID") tag associated with it, the RFID tag storing TLI readable by a smartphone or other device.

FIGS. 7-10 depict an Easy Shaker with a lid 4, sleeve 2, and container 1 with a blank space or area 23A for printing a linear barcode with TLI.

Figure 17:
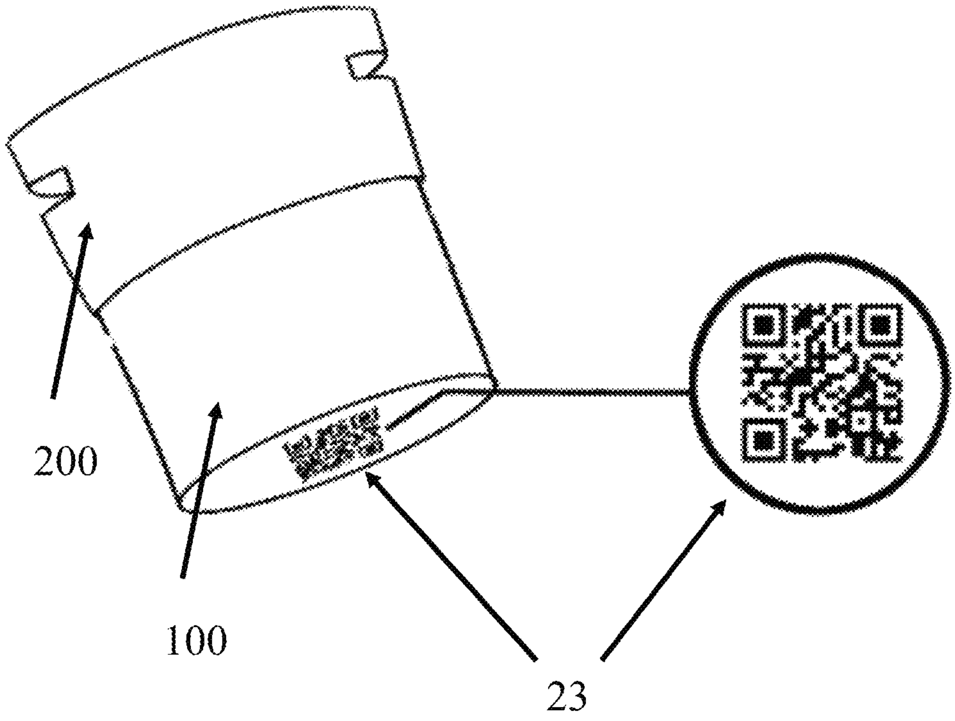
FIG. 17 depicts, from a lower perspective view, an alternative embodiment of an Easy Shaker having a QR code on the bottom thereof.

FIG. 17 depicts an Easy Shaker with a sleeve 200 and a container 100 similar to FIG. 16. The container 100 has a Quick Response code 23 ("QR code" e.g., ISO/IEC18004) printed on the bottom thereof, the QR code comprising TLI embedded therein.

Figure 17A:
FIG. 17A depicts, from a lower perspective view, a collectible embodiment of an Easy Shaker having a QR code on the bottom thereof.

FIG. 17A depicts a collectible, decorated Easy Shaker with a container 1, sleeve 2, and lid 4 similar to FIG. 1. The container 1 has a QR code 23 printed on the base 21 thereof, the QR code comprising TLI.

In some embodiments, the token linking information may be hidden or obscured by a scratch-off or peel-off material. In some embodiments, the TLI may only be visible once the Easy Shaker has been configured in a deployed position. In some embodiments, a seal may be present which must be broken or removed to obtain the TLI, or be broken or removed in order to configure the Easy Shaker into a deployed position to thereby reveal the TLI.

For example, with respect to FIG. 1, a seal may seal the lid 4 to the top of the Easy Shaker sleeve 2 so as to make removal of the lid difficult or impractical without breaking the seal. Once the seal is broken, the lid may be removed and the TLI present on the underside of the lid accessed. In other embodiments, the TLI may be present on the underside of the seal.

In some embodiments, the token linking information comprises information sufficient to grant access to a pre-existing token. For example, in the Ethereum context, knowledge of a public/private key pair for an EAO on the Ethereum network provides a user with sufficient access to control the EAO and any tokens currently associated with that EAO. In some embodiments, the TLI itself may contain the public/private key pair for an address on a blockchain, (or sufficient information to derive or infer the public/private key pair for an address on a blockchain) that address having one or more tokens associated therewith. The TLI may be obtained, for example by reference to FIGS. 17 and 17A, by obtaining an Easy Shaker and reading the QR code 23 with a QR code reader (e.g., a camera application or QR code reader application on a computer such as a desktop or a smartphone), extracting the TLI information from the QR code with the QR code reader, and then using a wallet application on the computer to utilize the keys in the TLI to access the token(s) associated with the wallet.

In some embodiments, the token linking information comprises an identifier which may be used as a lookup value in a database to find an entry or entries linking the TLI to one or more tokens (fungible, non-fungible, or a combination thereof) present (or, in some embodiments, mintable) on a blockchain. In some embodiments, the token linking information comprises an identifier without a corresponding database entry or entries. In such embodiments, a database may have information (or a lack of information) concerning whether or not the TLI has been used previously to access or obtain a token, and where in is determined that the TLI has not been previously used, a new token may be minted.

Figure 18:
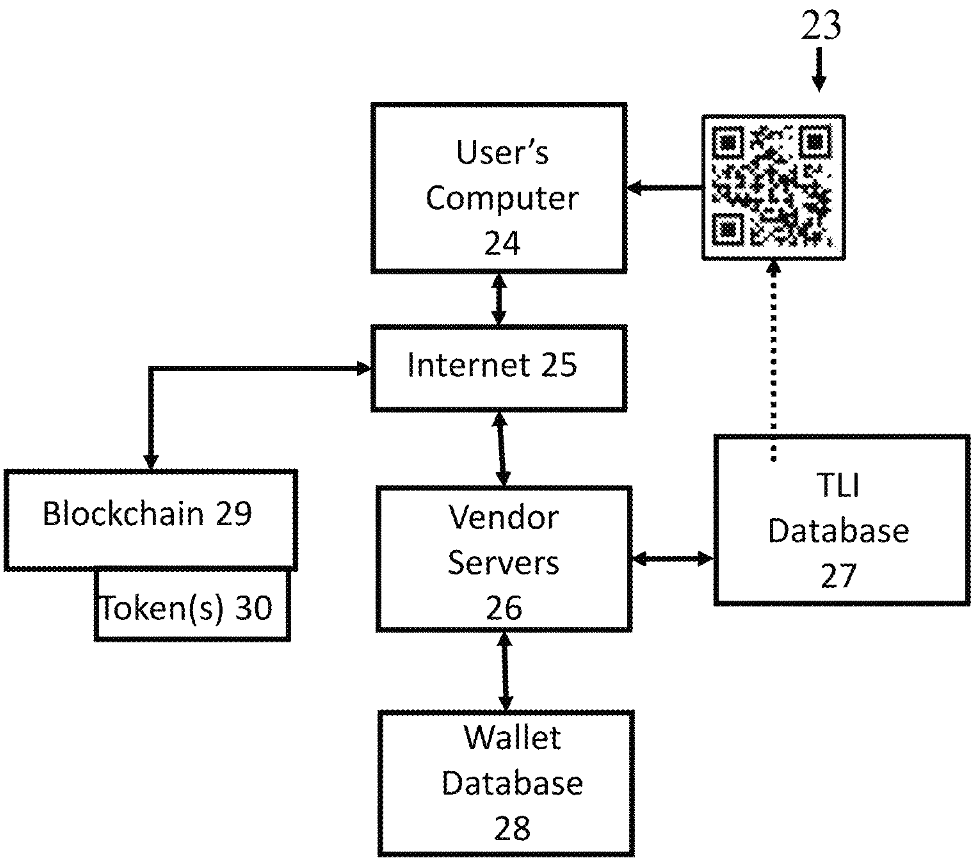
FIG. 18 depicts a system for facilitating the use of a non-fungible token on a blockchain associated with an object-in this example, an Easy Shaker.

FIG. 18 illustrates an example system with various options usable in methods (including one set forth in FIG. 19) of utilizing NFTs with the Easy Shaker. In one example, a user at a movie theater acquires an Easy Shaker (in this case a container, sleeve, and lid) with a QR code 23 located on the bottom of the container, the movie theater being a "vendor". (The elements of the Easy Shaker and the location of the QR code may vary as explained earlier.) The Easy Shaker happens to be a decorated, collectible Easy Shaker with gold foil and has an image of an actor in the context of a movie, and happens to also be signed by the actor, hypothetically rendering this specific Easy Shaker of significant value.

A user's computer 24, which may be, e.g., a smartphone with a processor, camera, QR code reading and interpreting software (typically associated with the default camera application controlling the camera, but sometimes a stand-alone QR code reading application), and internet connectivity as typified by well-known Apple iPhone and Android phones (e.g., iPhone 12 and Google Pixel 7 which have QR code readers associated with their default camera applications), or a portable computer such as a laptop having a processor, camera, QR code reading and interpreting software, and internet connectivity (e.g., Dell Latitude 5430 with Windows 10 or 11 utilizing the Windows camera application), obtains token linking information embedded in QR code 23, in this case by opening the camera application on the computer to read the QR code using the camera and camera application and to interpret the QR code to obtain the encoded TLI.

In one embodiment, the TLI comprises a uniform resource locator ("URL") with one or more specific parameters (e.g., one or more ASCII or Unicode characters indicative of serial number(s), key(s), hash(es), search query(s) or indexed entry(s)) that the user can access with their computer 24 over the internet 25 using a web browser or other software application. The user's computer, typically the camera application, may then trigger a web browser (or in some embodiments, a user may copy and paste the TLI (or a portion thereof) from the QR code reading software into a web browser) which utilizes (all or a portion of) the TLI to access over the internet 25 a website on the vendor servers 26 (or in some embodiments, the user manually accesses the website and then provides all or a portion of the TLI to the website). Once the URL is accessed, the vendor system may correlate one or more of the specific parameters from the URL (or the TLI) with information in the TLI database 27 to identify one or more tokens 30 (associated with one or more of the parameters) residing on blockchain 29.

In other embodiments, a vendor specific application (e.g., a movie theater application, or in other embodiments a third-party application), may interface with the camera to read and interpret the QR code to obtain the TLI and utilize the TLI to trigger a web browser internal to the movie theater's application or directly transfer all or a portion of the TLI to the vendor servers. Once accessed, the vendor servers may correlate one or more of the specific parameters from the TLI with information in the TLI database 27 and/or the wallet database 28 (e.g., by correlating the TLI with a wallet and a wallet to an address and an address to a token, or in some embodiments, by correlating the TLI directly to an address on the blockchain 29 having one or more token(s) 30, or in some embodiments by correlating the TLI directly to a wallet having an address on the blockchain 29) to identify one or more tokens 30 residing on blockchain 29.

(Upon accessing the vendor servers 26, in some cases the user may be required to create an account with a username and password, or provide authenticating information. In some cases, a user may have already created an account and/or authenticated itself with the vendor's servers 26.)

In one example embodiment, the vendor servers 26 a have access to a wallet database 28 comprising a set of wallets (e.g., one or more wallets) for addresses on the corresponding blockchain 29. Information from the TLI or the TLI database is used by the vendor servers 26 to identify one or more wallets holding or associated with one or more tokens. The specific wallet(s) may then be used to transfer the token(s) to one or more addresses specified by the user. In some cases, access to the wallet(s) themselves may be provided to the user so as to minimize transaction fees on the blockchain 29. In some cases, the vendor servers 26 may control the wallet and the user may access the wallet by authenticating itself, directly or indirectly, with the vendor servers 26. In some embodiments, the NFT has metadata that associates the NFT with the collectible, signed Easy Shaker itself. In other embodiments, other real world or digital items may be associated with the NFT.

The vendor servers may comprise a single server (e.g., an internet-connected web server and underlying computer hardware and software including a processor, power supply, memory, an operating system, and one or more databases), or multiple servers interacting with each other. While the discussion herein concerns a single vendor (e.g., a move theater) both selling the Easy Shaker and providing servers to access the NFT associated with the TLI extracted from the QR code on the Easy Shaker's container, multiple actors may be involved. A user might acquire the Easy Shaker from one company or website (e.g., Amazon.com or Ebay.com), but would thereafter communicate with an unrelated collectible NFT website (e.g., Opensea.com or Veve.me) vendors servers. Additional actors may be involved in storing the TLI database and/or Wallet Database with the vendor servers communicating therewith over the internet.

In some embodiments, the NFT(s) or other token(s) that correspond to, or come to be associated with, TLI are pre-generated, meaning that they exist prior to the user obtaining TLI. For example, a certain NFT might be a (one or many) special scene(s) created in connection with a movie but not included in the initial release of the movie. A company may wish to promote the possibility of "owning" or "winning" a special scene as a NFT. By purchasing (or otherwise obtaining) an Easy Shaker apparatus (e.g., at the movie theater), a movie goer (user) may have a chance of obtaining that NFT if the user's purchased Easy Shaker had the TLI that corresponds to, or comes to be associated with, the NFT.

Figure 19:
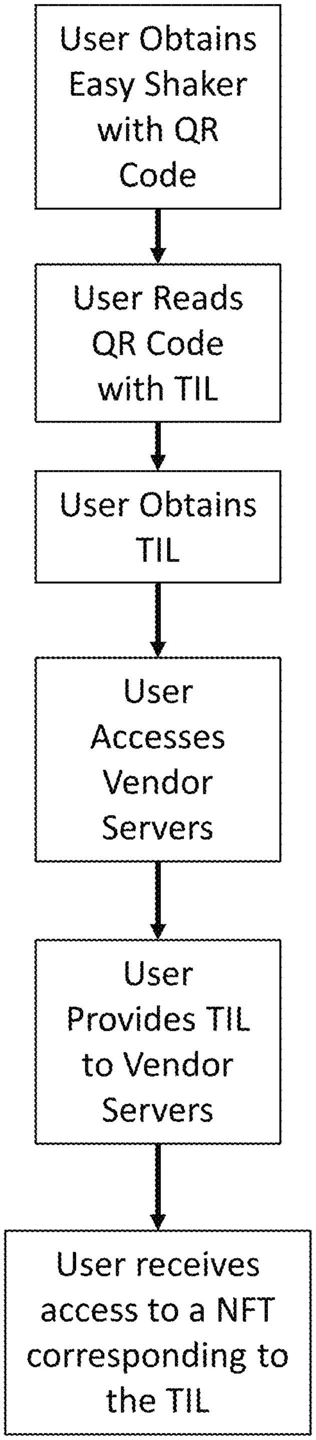
FIG. 19 depicts method steps for utilizing an Easy Shaker to obtain access to a non-fungible token on a blockchain.

In conjunction with the promotion, TLI is created. The special movie scene is created. The special movie scene is stored in video format and posted to a website having a certain URL. The meta-data for the movie scene (e.g., a URL to the video and a brief description) is used for the creation of a NFT. A smart contract to support a/the NFT is created and added to the blockchain. The NFT is added to a blockchain. The TLI is linked to the NFT in a database (not strictly necessary if the TLI comprises a wallet, or information to infer a wallet, for an address present on the blockchain). The TLI is associated with an Easy Shaker apparatus by printing a QR code (or barcode) (or affixing an RFID tag) with embedded TLI on the Easy Shaker. Once those steps are completed (not necessarily in the above order), a user may then use the TLI from the Easy Shaker to access the NFT on a blockchain either directly and/or through the vendor servers as shown in the steps of FIG. 19.

In some embodiments, the NFT may be generated after receiving from a user one or more parameters corresponding to TLI associated with an Easy Shaker apparatus. For example, a company may want to distribute a digital image (e.g., a cartoonish avatar) as a NFT that corresponds to a character in a movie (or a set of digital images, each its own NFT). A large number of Easy Shakers may be distributed, each with TLI. However, not all persons who acquire an Easy Shaker will necessarily utilize the TLI to obtain a NFT. As such, after receiving from a user one or more parameters corresponding to TLI associated with an Easy Shaker, the vendor system may arbitrarily (e.g., randomly, by lottery, by user preference, by vendor preferences, or by considering one or more user characteristic such as income, zip code, age, gender, ethnicity, shopping habits, etc.) directly associate a NFT with one or more parameters from the TLI or the TLI itself (or indirectly associate a NFT with TLI, e.g., by associating the NFT with the user's account on the vendor system created in connection with the user accessing and/or providing TLI (or one or more TLI parameters) to the vendor servers, the account being associated with the TLI (or one or more TLI parameters)). In this embodiment, the number of NFTs to be distributed may be less than the total number of Easy Shakers distributed.

In some embodiments, the TLI may become associated with a set of NFT's from which the user may choose from. For example, TLI may comprise a URL with one or more parameters that are associated in a database with a set of NFTs. A user may then use the TLI to obtain access to the set of NFTs from which the user may select one (or more in some cases). The NFTs may be pre-existing or mintable.

In some embodiments, an Easy Shaker may have both TLI and a separate URL, either or both embedded in a digital format or human readable as explained earlier. For example, with respect to FIGS. 7 and 17A, the QR code 23 provides TLI, while the blank space location 23A has printed therein a human readable URL or a QR code which permits a user to obtain access to see the NFT (e.g., the movie scene) associated with the Easy Shaker by accessing the URL either manually or by using a QR code reader on a computer (e.g., a smartphone). In a preferred embodiment, the blockchain is the Ethereum blockchain.

While the foregoing examples have used an Easy Shaker as a physical object having TLI information associated therewith, the same principles may be applied to artwork, designer sneakers, baseballs, golf balls, soccer balls, footballs, sports cards, sporting goods, clothing, and other physical objects. And while some of the foregoing examples have used an Easy Shaker as a physical object having TLI information associated therewith, with the NFT associated therewith having descriptive information corresponding to the Easy Shaker, the NFT's descriptive information may correspond to a different physical or tangible object, or to a digital object, such as digital art, digital files, multimedia files, movie scenes, sports highlights, virtual avatars, video game skins, digital music, or other or intangible things capable of description in a NFT.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A method for utilizing a blockchain token comprising:

receiving from a user over the internet one or more parameters associated with token linking information, said token linking information being associated with a bucket;

providing to a user access to a token present in a blockchain that is associated with at least one of the one or more parameters received from the user, wherein the blockchain is the Ethereum blockchain.

2. The method of claim 1 further comprising a sleeve for encompassing the bucket, the sleeve comprising one or more side walls, the sleeve side walls defining an encompassed space, at least one sleeve side wall comprising a lower lip projecting at least toward the interior of the sleeve.

* * * * *